United States Patent
Oba et al.

(10) Patent No.: US 6,262,986 B1
(45) Date of Patent: Jul. 17, 2001

(54) METHOD AND APPARATUS FOR PACKET SCHEDULING USING QUEUE LENGTH AND CONNECTION WEIGHT

(75) Inventors: Yoshihiro Oba; Tsuguhiro Hirose, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/676,964

(22) Filed: Jul. 8, 1996

(30) Foreign Application Priority Data

Jul. 7, 1995 (JP) .................................................. 7-172490
Mar. 11, 1996 (JP) .................................................. 8-052813

(51) Int. Cl.[7] .................................................. H04L 12/56
(52) U.S. Cl. .................................................. 370/399; 370/418
(58) Field of Search .................................................. 370/229, 230, 370/231, 232, 234, 236, 237, 428, 389, 395, 396, 412, 411, 413, 414, 415, 416, 417, 418, 392, 235, 252, 351, 394, 397, 399, 409, 419, 468

(56) References Cited

U.S. PATENT DOCUMENTS

| | | | |
|---|---|---|---|
| 5,379,297 | 1/1995 | Glover et al. | 370/234 |
| 5,475,679 * | 12/1995 | Muntez | 370/412 |
| 5,541,912 * | 7/1996 | Choudhuex et al. | 370/412 |
| 5,583,864 * | 12/1996 | Lightfoot et al. | 370/396 |
| 5,619,502 * | 4/1997 | Kahn et al. | 370/412 |
| 5,748,614 * | 5/1998 | Wallmeier | 370/412 |

OTHER PUBLICATIONS

Nagle, "On Packet Switches with Infinite Storage", IEEE Transactions on Communications, vol. COM–35, No. 4, 1987, pp. 435–438.
Golestani, "A Self–Clocked Fair Queueing Scheme for Broadband Applications", IEEE Infocom, 1994, pp. 636–646.
Zhang, "VitualClock: A New Traffic Control Algorithm for Packet Switching Networks", Sigcomm, 1990, pp. 19–29.
Morgan, "Queueing Disciplines and Passive Congestion Control in Byte–Stream Networks", IEEE Infocom, 1989, pp. 711–720.

* cited by examiner

Primary Examiner—Dang Ton
(74) Attorney, Agent, or Firm—Foley & Lardner

(57) ABSTRACT

A packet scheduling scheme capable of realizing a fair scheduling regardless of weights of connections. A packet scheduler has a plurality of packet queues for temporarily storing entered packets, to each of which a weight is set up; a packet input unit for entering packets into the packet queues; a scheduling information management unit for managing scheduling information for specifying an order to read out packets stored in the packet queues, according to a queue length of each packet queue and the weight set up for each packet queue; and a packet output unit for reading out and outputting desired packets from the packet queues according to the scheduling information. In a case of fixed length packets, the scheduling information management unit always holds as many scheduling information corresponding to one packet queue as a smaller one the queue length of that one packet queue and the weight set for that one packet queue, so as to make a processing time required for scheduling constant regardless of a number of connections.

48 Claims, 19 Drawing Sheets

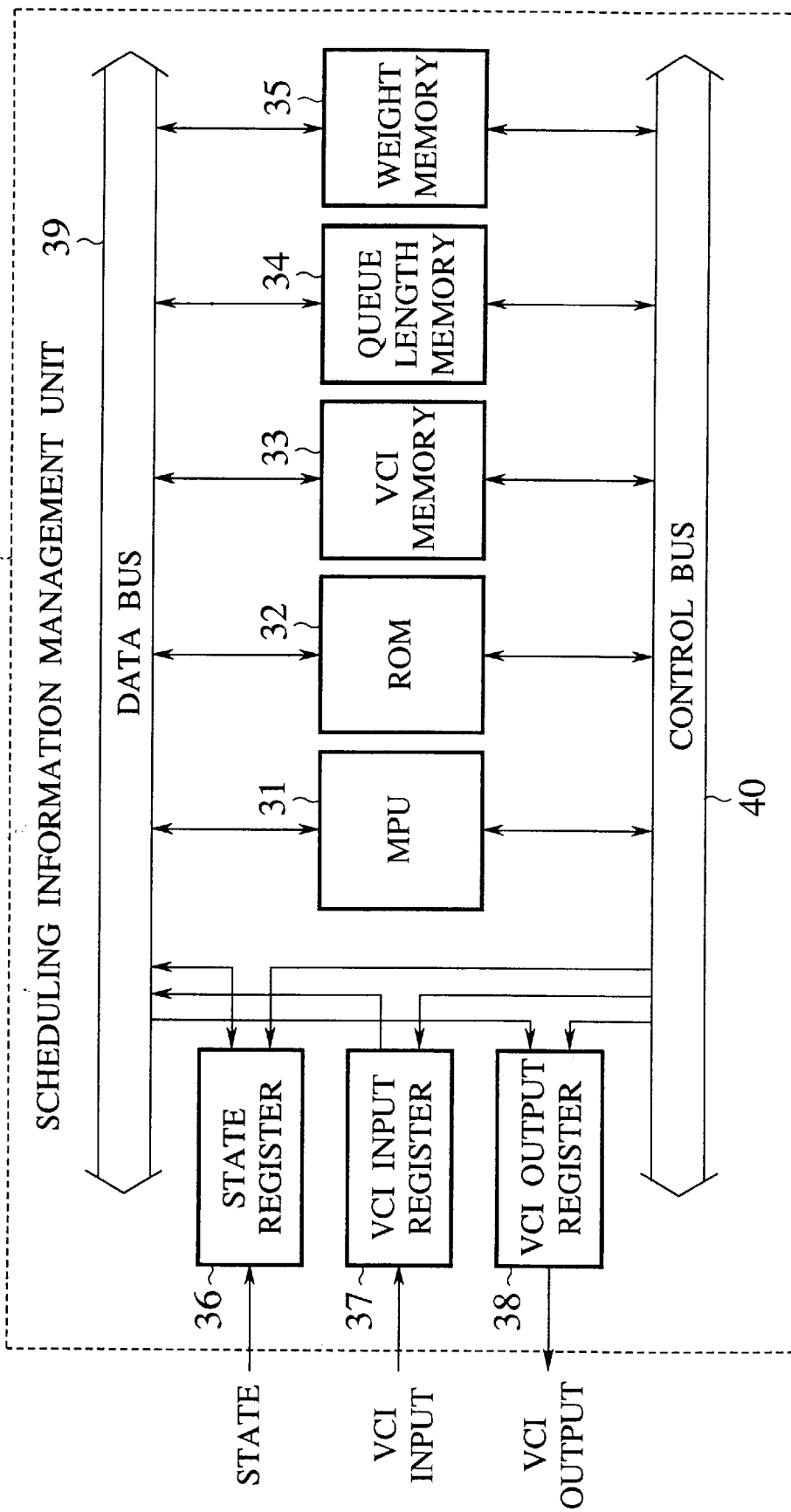

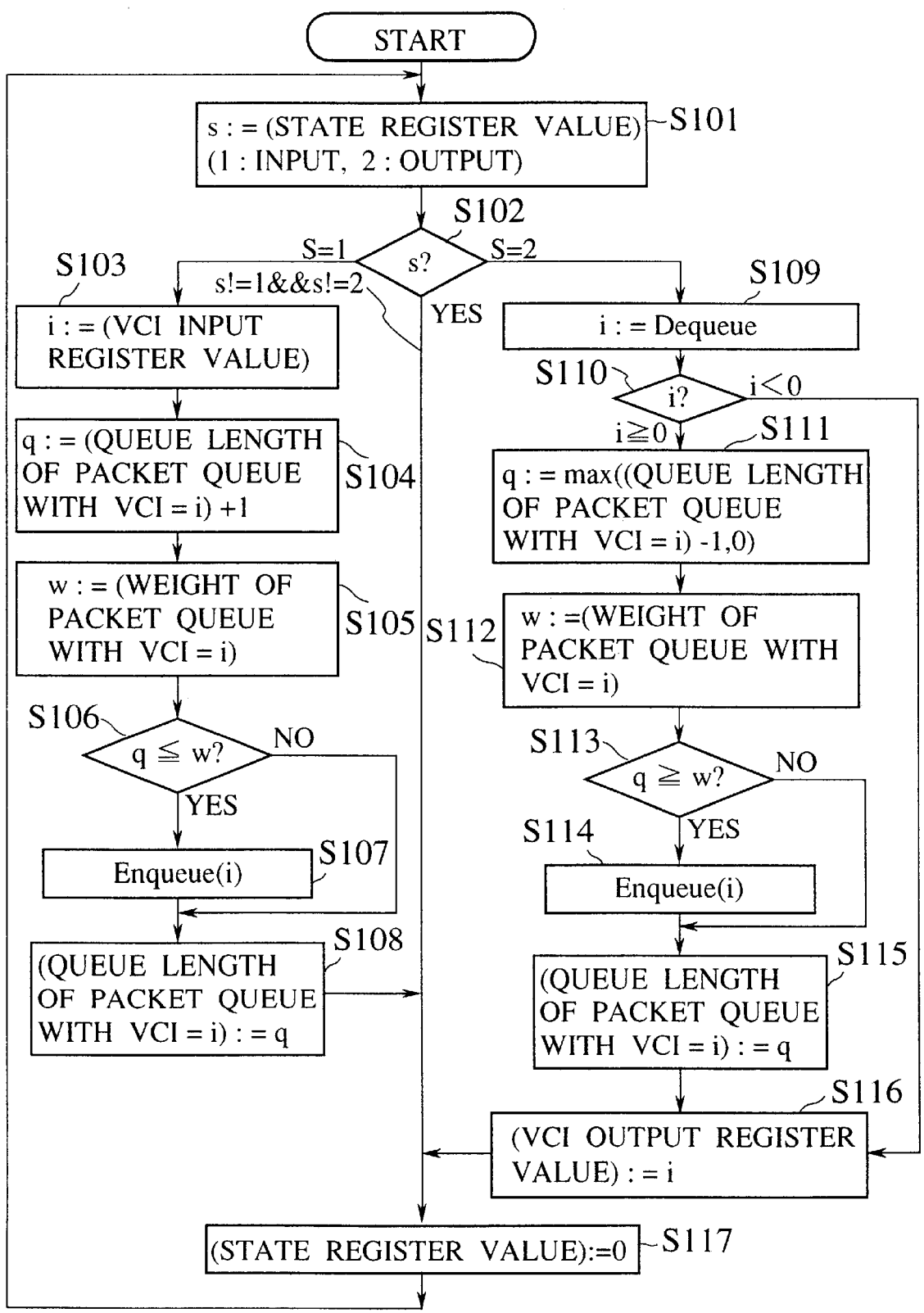

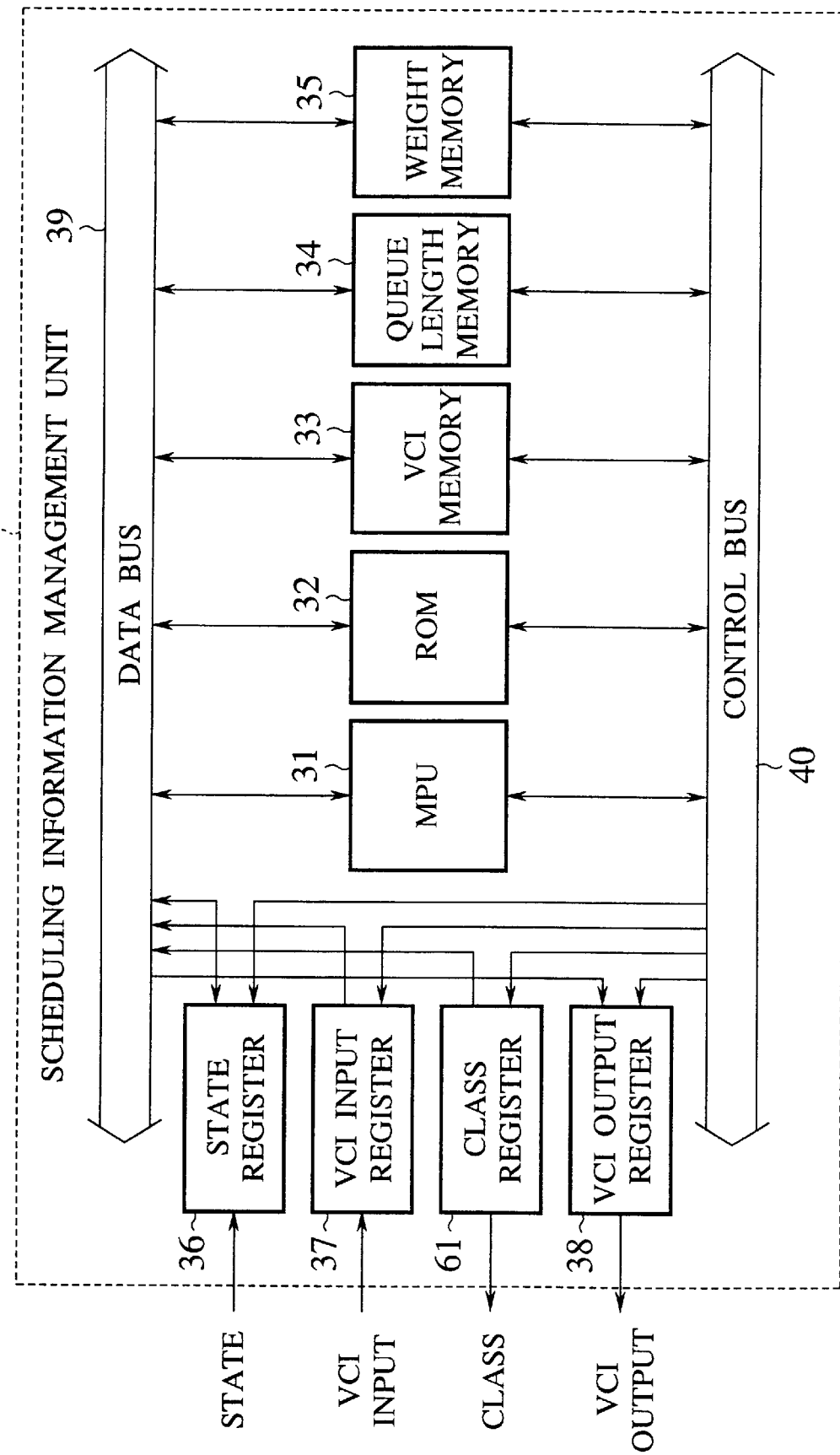

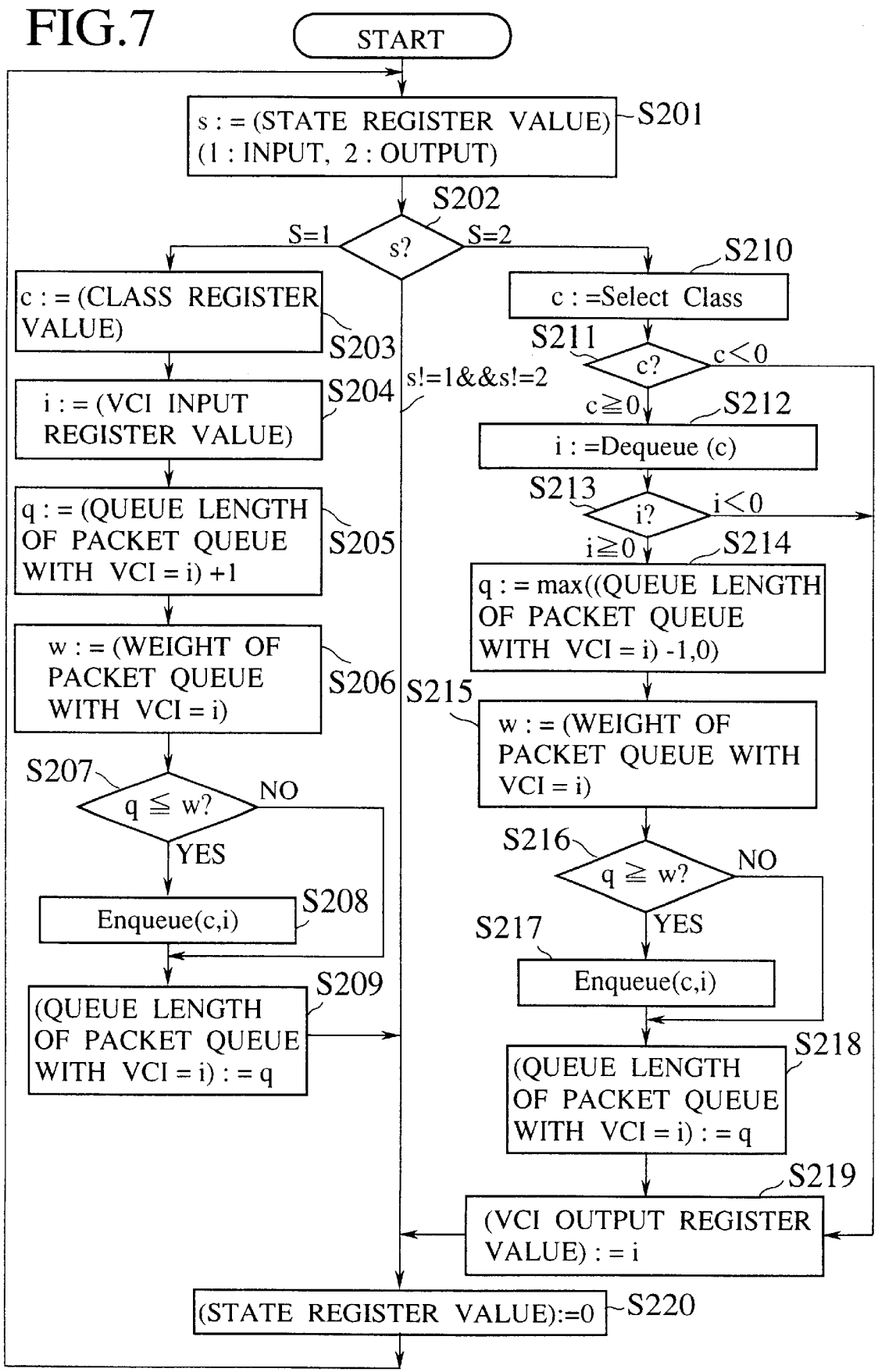

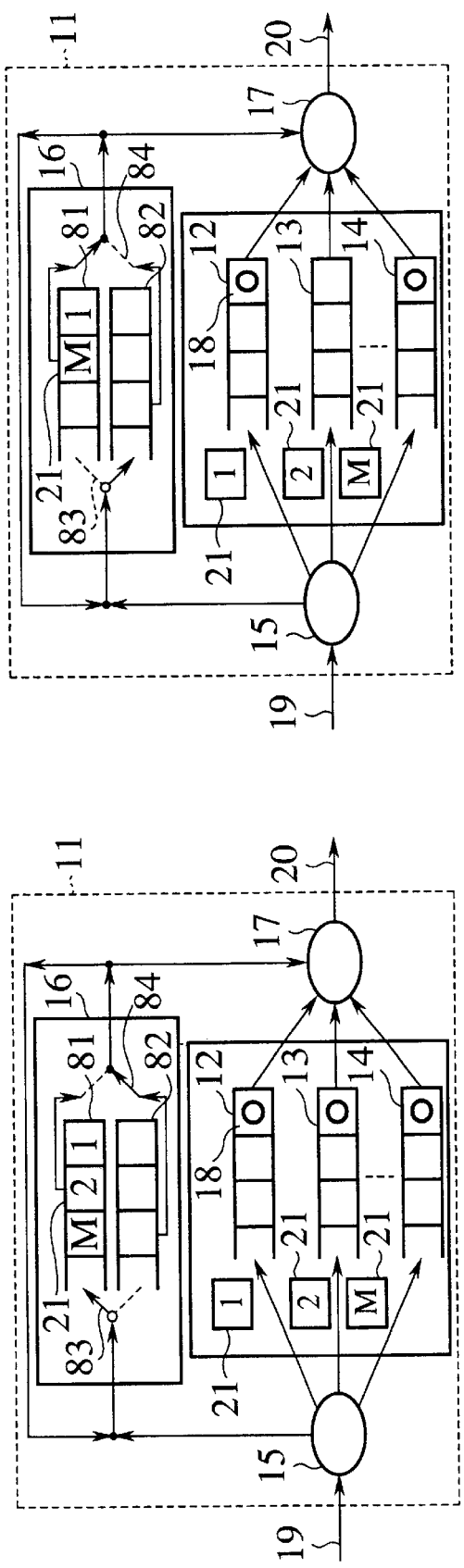
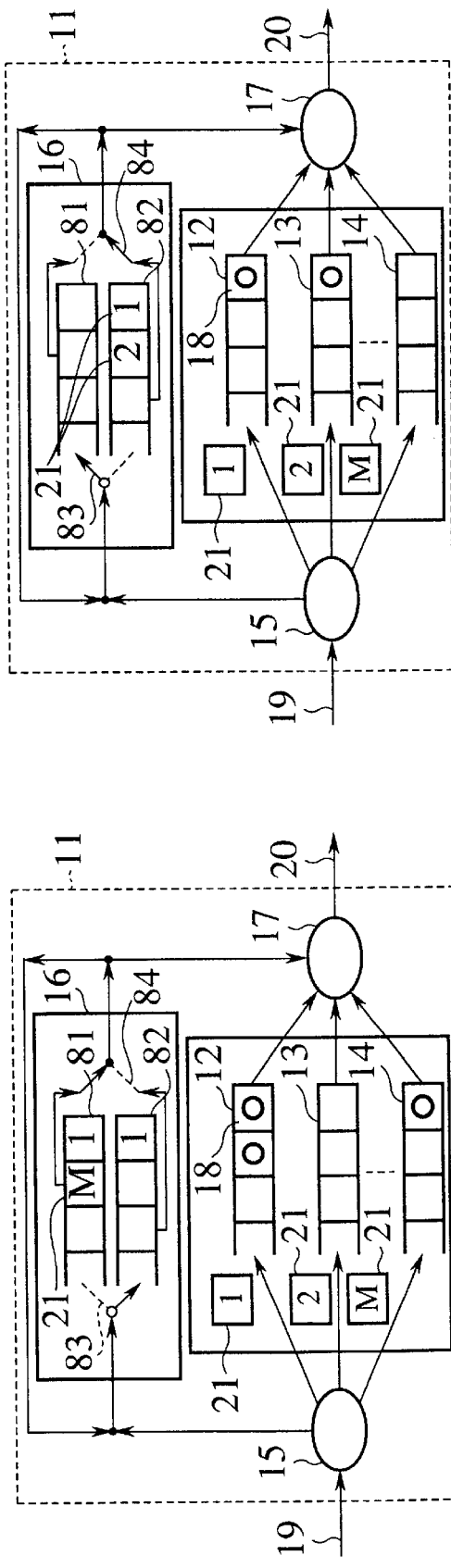
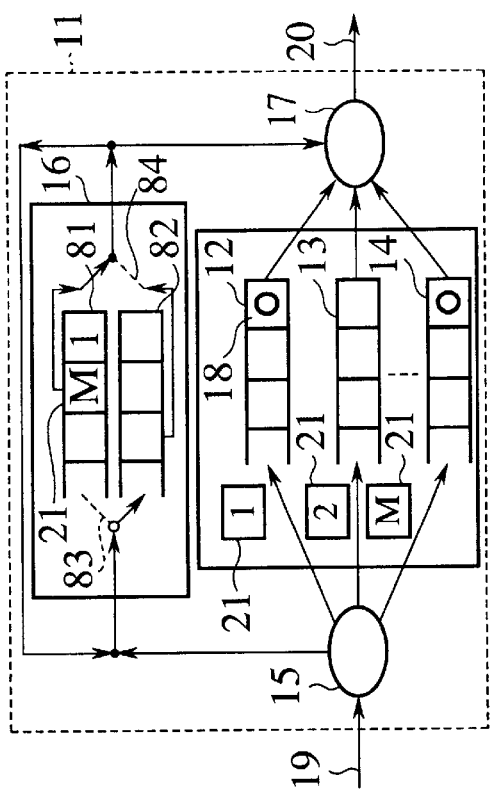

FIG.14A ( INTIALIZATION )
↓
FOR ALL CLASSES:
$W_i := 0, Q_i := 0$   — S601
↓
( END )

FIG.14B ( CALL SET UP FOR VCI = j(CLASS i) )
↓
$w_j := $ (WEIGHT OF VCI = j)   — S611
↓
$f_j := w_j - floor(w_j)$   — S612
↓
$w_{jnow} := w_j$   — S613
↓
$q_j := 0$   — S614
↓
$n_j := 0$   — S615
↓
$W_i := W_i + w_j$   — S616
↓
( END )

FIG.14C ( CALL DISCONNECT FOR VCI = j(CLASS i) )
↓
$W_i := W_i - w_j$   — S621
↓
( END )

FIG.14D ( CELL TRANSFER )
↓
s := (STATE REGISTER VALUE)
(1 : INPUT, 2 : OUTPUT)   — S631
↓
S632 s? 
- S=1 → CELL INPUT PROCESSING — S633
- S=2 → CELL OUTPUT PROCESSING — S634
- s!=1 && s!=2 →
↓
(STATE REGISTER VALUE) := 0   — S635
↑ (loop back)

METHOD AND APPARATUS FOR PACKET SCHEDULING USING QUEUE LENGTH AND CONNECTION WEIGHT

BACKGROUND OF THE INVENTION

1. Field of the Invention

The present invention relates to a packet scheduling method and a packet scheduling apparatus for selectively outputting buffered packets in a packet network such as an ATM network.

2. Description of the Background Art

In a packet network based on an ATM (Asynchronous Transfer Mode) scheme, a packet in a fixed length of 53 octets called a cell is transmitted. In the ATM scheme, a connection is identified by identifiers called VCI (Virtual Channel Identifier) and VPI (Virtual Path Identifier) contained in a header section of a cell.

Also, the ATM scheme defines the service classes to which connections belong, including a CBR (Constant Bit Rate), a real time VBR (Variable Bit Rate), a non-real time VBR, ABR (Available Bit Rate), and UBR (Unspecified Bit Rate). Then, for each of these service classes, a QOS (Quality Of Service) regarding required cell loss rate and/or cell delay is specified. More specifically, the required values for both the cell loss rate and cell delay are specified for the service classes of CBR and real time VBR, whereas the required value for only the cell loss rate is specified for the service class of ABR and non-real time VBR, and no QOS is specified for the service class of UBR.

At a time of connection set up, a user reports parameters regarding traffic characteristics of a connection to a network, and the network sets up a connection if it is possible to guarantee the required QOS for this connection when it transmits cells without violating the reported parameters. For the reported parameters, a peak cell rate is used in a case of the service class of CBR, while a peak cell rate, an average cell rate, and a maximum burst length are used in the service classes of real time VBR and non-real time VBR.

It is necessary for the network to guarantee the QOS for a connection which is transmitting cells without violating the reported parameters, regardless of the other connections, even when there is another connection which is transmitting cells in violation to the reported parameters. To this end, there is a control called a UPC (Usage Parameter Control) which regulates inputs for a connection which is transmitting cells in violation to the reported parameters by monitoring a transmission rate of a connection at an entrance of the network. When this UPC is appropriately carried out, it is possible to guarantee the QOS for a connection which is transmitting cells without violating the reported parameters, regardless of the other connections, by managing cells of a plurality of connections at an ATM switch using a single or class by class FIFO (First-In First-Out) queues.

However, in a case where a cell rate by which a terminal can transmit cells varies dynamically while a connection is connected depending on a state of a network, such as a case of the service class of ABR, an accurate UPC is difficult to realize so that each connection tends to receive an influence from the other connection. In addition, the UPC is not supposed to be carried out for the service class of UBR, but it is preferable to carry out a control to use the bandwidth as evenly as possible among connections in the service class of UBR. Consequently, for the service class of ABR and/or UBR, there is a need to provide a queue for each connection and carry out the packet scheduling among a plurality of queues, instead of management using a single or class by class FIFO queues.

For this packet scheduling, a scheme called an FQ (Fair Queueing) scheme which provides services fairly at equal rates for all connections in a particular class has been proposed in: John B. Nagle, "On Packet Switches with Infinite Storage", IEEE Transactions on Communications, Vol. COM-35, No. 4, pp. 435–438, April 1987. This FQ scheme is realized by serving active (not vacant) queues in the round robin fashion, but this scheme is not appropriate when requested bandwidths are different for different connections. Moreover, there is a need to account for a packet length in a case of using packets in variable lengths.

For this reason, there are propositions for a packet scheduling scheme called a WFQ (Weighted Fair Queueing) which realizes the packet scheduling by giving weights to connections according to their utilization bandwidths, and providing services fairly at accordingly weighted rates while taking a packet length into account. As a specific algorithm for this WFQ scheme, an algorithm called an SCFQ (Self-Clocked Fair Queueing) has been proposed in: S. J. Golestani, "A Self-Clocked Fair Queueing Scheme for Broadband Applications", Proc. of IEEE INFOCOM '94, pp. 636–646, 1994, while a similar algorithm called a Virtual Clock has been proposed in: L. Zhang, "virtual Clock: A New Traffic Control Algorithm for Packet Switching Networks", Proc. of ACM SIGCOMM '90, pp. 18–29, 1990.

Now, assuming that the packet scheduling apparatus has a queue for each connection and a connection is to be identified by an identifier, according to the SCFQ, each connection i has a weight $w_i$ proportional to utilization bandwidth and a variable $F_i$, and when a packet arrives at the packet scheduling apparatus, a value of the variable $F_i$ is updated and the updated variable $F_i$ is stored into the queue along with the arrived packet. At a time of outputting packets, a packet of a connection having the smallest $F_i$ value among the variables $F_i$ of top packets in the active queues is served. Here, the variable $F_i$ is updated by:

$$F_i = L/w_i + \max(F_i, v(ta))$$

where L is a packet length of the arrived packet, ta is an arrival time of the arrived packet, and v(ta) is a non-decreasing function called virtual time. In SCFQ, v(ta) returns a value of the variable $F_j$ for a packet of a connection j which is being served or just finished being served at a time ta. In Virtual Clock, v(ta) is equal to ta.

However, the conventionally proposed packet scheduling scheme based on an algorithm such as SCFQ or Virtual Clock has the following two major problems.

The first major problem is that it is difficult to provide services fairly in a short time scale in a case of scheduling packets of connections with large weight differences. For instance, suppose that the queues corresponding to connections have total 101 pieces of packets including 100 pieces of packets for 100 pieces of connections with a weight value 1 and one piece of packet for one piece of connection with a weight value 100, and packets of the connection with a weight value 100 arrived consecutively in this state. To be completely fair, packets of 100 pieces of connections with a weight value 1 and packets of one piece of connection with a weight value 100 should be scheduled alternately, but in the SCFQ or Virtual Clock, at most 100 pieces of packets of the connection with a weight value 100 are outputted first, and then packets of the connections with a weight value 1 are outputted.

In other words, when a group of connections with a large weight value and a group of connections with a small weight value are present and a sum of weight values of the connections is the same for both groups, there is a problem in that the packets of the group of connections with a large weight value will be always favored in a short time scale, which results in an increase of delay jitter for connections with smaller weights even when the traffic load is small.

The second major problem is that a calculation time required in calculating the smallest value of the variable Fi at a time of the packet scheduling increases as a number of connections increases. Assuming that the variables Fi are always sorted, when a number of connections is n, a calculation time required in calculating the smallest value will be in the same order as a time for inserting a new Fi into a sequence of sorted Fi, i.e., an order of $0(\log_2 n)$. In a case of ATM, in order to support a maximum number of virtual connections (VC)=4096 per one physical link, it requires at most $\log_2(4096)=12$ times of searches in calculating the smallest value of the variable Fi.

In view of this increase of the calculation time, and in consideration to a case of carrying out the scheduling not only for packets but also for classes and virtual paths (VP) or a case of a large link rate, the algorithm such as SCFQ and Virtual Clock is difficult to implement in practice, in this regard, there is a demand for the packet scheduling scheme in which the processing time required for the scheduling is short regardless of a number of connections.

On the other hand, U.S. Pat. No. 5,379,297 entitled "Concurrent Multi-Channel Segmentation and Reassembly Processors for Asynchronous Transfer Mode" discloses a scheme in which a queue is formed for each peak rate and the WFQ is carried out among a plurality of queues in the processing time which is independent of a number of connections. However, this scheme cannot support arbitrary combination of peak rates (weights).

SUMMARY OF THE INVENTION

It is therefore an object of the present invention to provide a method and an apparatus for packet scheduling capable of realizing a fair scheduling regardless of weights of connections.

It is another object of the present invention to provide a method and an apparatus for packet scheduling capable of making a processing time required for scheduling constant regardless of a number of connections, when received packets are fixed length packets.

According to one aspect of the present invention there is provided a packet scheduling apparatus, comprising: a plurality of packet queues for temporarily storing entered packets, to each of which a weight is set up; packet input means for entering packets into at least one of said plurality of packet queues; scheduling information management means for managing scheduling information for specifying an order to read out packets stored in said plurality of packet queues, according to a queue length of each packet queue and the weight set up for each packet queue; and packet output means for reading out and outputting desired packets from said plurality of packet queues according to the scheduling information managed by the scheduling information management means.

According to another aspect of the present invention there is provided a method of packet scheduling in a scheduler, comprising the steps of: entering packets into at least one of a plurality of packet queues of the scheduler for temporarily storing entered packets, to each of which a weight is set up; reading out and outputting desired packets from said plurality of packet queues according to a scheduling information; managing the scheduling information for specifying an order to read out packets stored in said plurality of packet queues, according to a queue length of each packet queue and the weight set up for each packet queue, in response to entering and outputting of packets at the entering step and the reading step.

Other features and advantages of the present invention will become apparent from the following description taken in conjunction with the accompanying drawings.

BRIEF DESCRIPTION OF THE DRAWINGS

FIG. 3 is a block diagram of an exemplary configuration of a scheduling information management unit in the apparatus of FIG. 2.

FIG. 4 is a flow chart of the scheduling algorithm executed in the scheduling information management unit of FIG. 3.

FIG. 6 is a block diagram of an exemplary configuration of a scheduling information management unit in a packet scheduling apparatus according to the fourth embodiment of the present invention.

FIG. 7 is a flow chart for the scheduling algorithm executed in the scheduling information management unit of FIG. 6.

FIGS. 8A. 8B, 8C and 8D are block diagrams of a packet scheduling apparatus according to the fifth embodiment of the present invention, in four different states.

FIG. 14A, 14B, 14C, 14D, 14E and 14F are flow charts of the scheduling algorithm executed in a packet scheduling apparatus according to the ninth embodiment of the present invention.

DETAILED DESCRIPTION OF THE PREFERRED EMBODIMENTS

Figure 1:
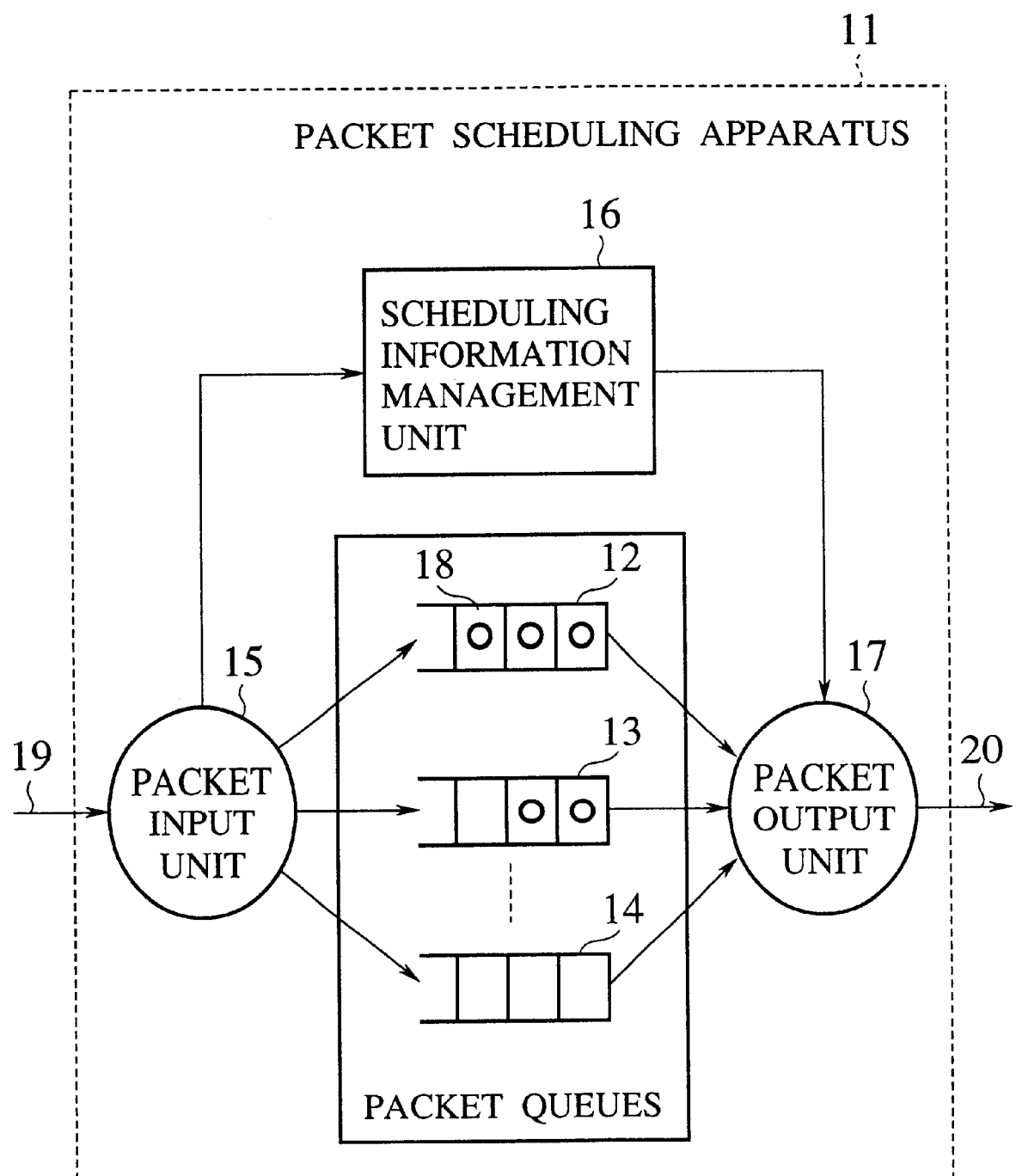
FIG. 1 is a block diagram of a packet scheduling apparatus according to the first embodiment of the present invention.

Referring now to FIG. 1, the first embodiment of a method and an apparatus for packet scheduling according to the present invention will be described in detail.

In this first embodiment, the packet scheduling apparatus 11 comprises: a plurality of packet queues 12, 13, 14 for storing packets; a packet input unit 15 for entering packets into the packet queues 12, 13, 14 at a time of packet reception; a scheduling information management unit 16 for managing a scheduling information which specifies an order to read out packets 18 stored in the the packet queues 12, 13, 14; a packet output unit 17 for reading out specified packets from the packet queues 12, 13, 14 according to the scheduling information managed by the scheduling information management unit 16 at a time of packet transmission; a packet input line 19 for inputting reception packets into the packet input unit 15; and a packet output line 20 for outputting transmission packets from the packet output unit 17.

Next, the operation of this packet scheduling apparatus 11 of FIG. 1 will be described.

A packet received by the packet scheduling apparatus 11 is entered from the packet input line 19 into the packet input unit 15. In general, the packet input line 19 includes a plurality of input lines. The packet input unit 15 then enters the packet inputted from the packet input line 19 into an appropriate one of the packet queues 12, 13, 14 according to a header information of this packet. Here, when the received packet is a uni-cast packet, the packet will be entered into one packet queue, but when the packet scheduling apparatus 11 supports the multi-cast, the packet may be entered into a plurality of packet queues for handling the multi-cast.

The packet queues 12, 13, 14 can be provided in correspondence to different virtual connections, different VC (Virtual Channel) connections, different traffic classes, different VP (Virtual Path) connections, different output links, or a combination of any two or more of these. In this first embodiment, it is assumed that the packet queues 12, 13, 14 are provided in correspondence to different VC connections. For these VC connections, respective requested bandwidths are set up.

The scheduling information management unit 16 inputs from the packet input unit 15 a VCI (Virtual Channel identifier) as the scheduling information for specifying an order to read out the packets stored in the packet queues 12, 13, 14, and outputs the scheduling information to the packet output unit 17. Here, the scheduling information management unit 16 manages the VCI as the scheduling information according to an amount of stored packets (which will be referred hereafter as a queue length) for each packet queue and a weight corresponding to each packet queue, and determines an order to output the scheduling information to the packet output unit 17 according to these queue lengths and weights of the packet queues 12, 13, 14.

In this first embodiment, each packet queue is assigned with a weight which is set equal to a relative ratio of the bandwidth set up for the VC connection corresponding to each packet queue. In the following, the weight of the bandwidth set up for the VC connection corresponding to the packet queue to be identified by VCI=i will be denoted as wi, and the queue length of this packet queue to be identified by VCI=i will be denoted as qi.

When a packet of VCI=i arrives at the packet input unit 15 or when a packet of VCI=i is outputted from the packet output unit 17, the scheduling information management unit 16 updates a variable Fi which is given by the following equation (1), and determines the VCI of a packet to be outputted next.

$$Fi = f(qi, wi) \quad (1)$$

Here, a function f appearing in the equation (1) is to be determined according to the desired scheduling policy to be used.

For example, when this function f is given by the following equation (2), it is possible to realize the scheduling policy in which, when the queue length qi is not greater than the weight wi, the bandwidth according to the weight wi will not be given to the VC connection i so that the bandwidth can be given to the other connections.

$$f(qi, wi) = \frac{L}{\min(qi/Lmin, wi)} + \max(Fi, v(ta)) \quad (2)$$

where L is a packet length of the arrived packet, Lmin is a minimum packet length handled in the packet scheduling apparatus 11, ta is an arrival time of the arrived packet, and v(ta) is a virtual time mentioned above.

Note here that when the above function f is given by the following equation (3), the resulting packet scheduling will be equivalent to the virtual time basedscheduling algorithms such as SCFQ and Virtual Clock which do not depend on the queue length qi.

$$f(qi, wi) = \frac{L}{wi} + \max(Fi, v(ta)) \quad (3)$$

At a time of packet transmission, the packet output unit 17 takes out one VCI from the scheduling information management unit 16, reads out a packet from the packet queue corresponding to the taken out VCI, and outputs the read out packet to the packet output line 20.

In this packet scheduling apparatus 11 according to the first embodiment, the VCI as the scheduling information is managed according to the queue lengths and the weights set up for the packet queues 12, 13, 14, so that it becomes possible to realize the sophisticated packet scheduling which accounts not only the weight value set up for the active packet queue but also the queue length of that active packet queue.

Consequently, by assigning the weights of the bandwidths that are set up for the VC connections corresponding to the packet queues 12, 13, 14 as the weights of the packet queues 12, 13, 14, those VC connections for which a queue length normalized by Lmin is not greater than the weight will not fully use the corresponding bandwidths according to the weights so that the bandwidth can be given to the other connections.

Thus even when a group of connections with a large weight value and a group of connections with a small weight value are present and a sum of weight values of the connections is the same for both groups, it is possible to prevent the packets of the group of connections with a large weight value from being always favored in a short time scale, and therefore it is possible to provide small delay jitters.

Figure 2:
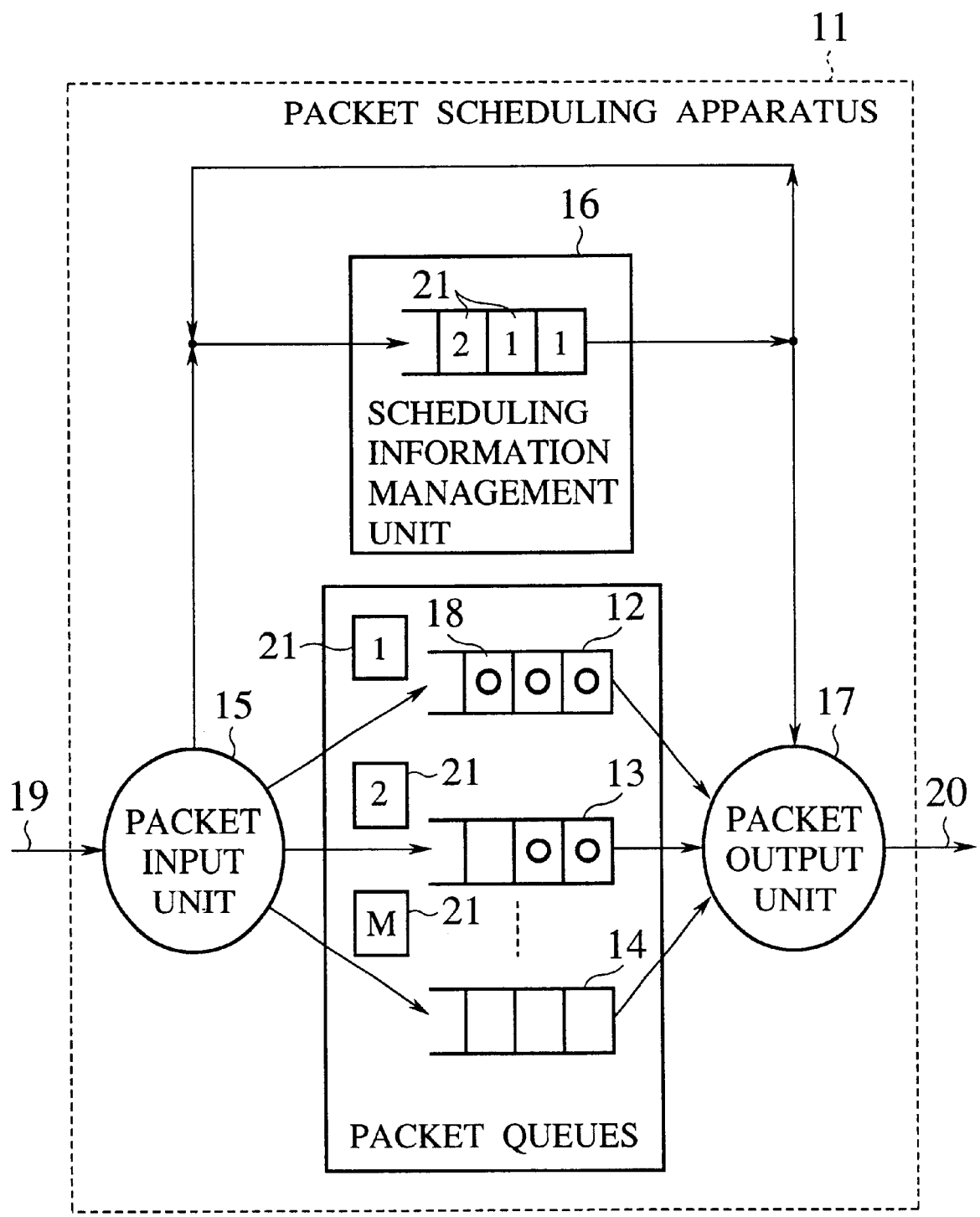
FIG. 2 is a block diagram of a packet scheduling apparatus according to the second embodiment of the present invention.

Referring now to FIG. 2 to FIG. 4, the second embodiment of a method and an apparatus for packet scheduling according to the present invention will be described in detail.

This second embodiment is directed to a more concrete embodiment based on the first embodiment described above, for an exemplary case of scheduling for fixed length packets such as ATM cells. In this second embodiment, M sets of packet queues are used, and the VCI is used as the scheduling information similarly as in the first embodiment. In the following, those elements of the packet scheduling apparatus which are similar to the corresponding elements in the first embodiment will be given the same reference numerals in the figures, and differences from the corresponding elements of the first embodiment will be mainly described below.

In this second embodiment, the packet scheduling apparatus has a configuration as shown in FIG. 2, in which the scheduling information management unit 16 always holds as many VCIs 21 corresponding to each one of M sets of the packet queues 12, 13, 14 as a smaller one of the queue length in terms of the number of packets and the weight set up for each packet queue.

In addition, the weights w1, w2, wM which are set equal to relative ratios of the bandwidths set up for the connections corresponding to the packet queues 12. 13. 14, are set up for the packet queues 12, 13, 14, respectively. Here, the weight of the bandwidth set up for the connection corresponding to the packet queue to be identified by VCI=i will be denoted as wi, and the queue length of this packet queue to be identified by VCI=i will be denoted as qi.

When a number of VCI=i held as the scheduling information by the scheduling information management unit is denoted as ni, the scheduling information management unit 16 is controlled in this second embodiment such that the following equation (4) always holds.

$$ni = \min(qi, wi) \quad (4)$$

In this case, there is a relationship expressed by the following equation (5).

$$f(qi, wi) = \min(qi, wi) \quad (5)$$

Note that when the weights of the packet queues 12, 13, 14 are set as w1=w2=wM=1, the resulting packet scheduling will be equivalent to the conventional FQ scheme proposed in: John B. Nagle, "On Packet Switches with Infinite Storage", IEEE Transactions on Communications, Vol. COM-35, No. 4, pp. 435–438, April 1987, already mentioned above.

FIG. 2, shows a state in which the queue lengths of the packet queues 12, 13, 14 are q1=3, q2=2, qM=0, so that when the weights of the packet queues 12, 13, 14 are set as w1=2, w2=1, wM=3, the number of VCIs held in the scheduling information management unit 16 are n1=2, n2=1, nM=0, as indicated in FIG. 2. Note that, in FIG. 2, blank circle symbols written inside the packet queues 12, 13, 14 represent packets, so that a number of blank circle symbols in each packet queue indicates the queue length of each packet queue.

At a time of packet transmission, the packet output unit 17 takes out one VCI from the scheduling information management unit 16, reads out a packet from the packet queue corresponding to the taken out VCI, and outputs the read out packet to the packet output line 20, just as in the first embodiment described above.

FIG. 3 shows an exemplary configuration of the scheduling information management unit 16 of this second embodiment which uses VCI as the scheduling information.

This scheduling information management unit 16 of FIG. 3 comprises a processor (MPU) 31, a ROM 32, a VCI memory 33, a queue length memory 34, a weight memory 35, a state register 36, an input VCI register 37, and an output VCI register 38, which are connected with each other through a data bus 39 and a control bus 40.

The MPU 31 sequentially executes instructions programmed in the ROM 32.

The VCI memory 33 is a queue for storing VCI as the scheduling information, which is formed by a RAM. When the scheduling information management unit 16 is formed by a FIFO queue, this VCI memory 33 can be implemented as a linked list or a ring buffer.

The queue length memory 34 is a memory for storing the current queue length of each one of the packet queues 12, 13, 14, which is also formed by a RAM.

The weight memory 35 is a memory for storing the weight set up for each one of the packet queues 12, 13, 14, which is also formed by a RAM.

The state register 36 is a register for registering an information indicating an operation state of the scheduling information management unit 16, which is to be registered by an external device (not shown) and referred by the MPU 31. Here, the state register 36 has a value "1" when an input cell is present in each cell slot, or a value "2" after a cell input processing is finished.

The input VCI register 37 is a register for registering the VCI of a packet to be subjected to the scheduling, which is to be registered by an external device (not shown) and referred by the MPU 31.

The output VCI register 38 is a register for registering the VCI of a packet to be outputted, which is to be registered by the MPU 31 and referred by an external device (not shown). It is assumed that a packet is not going to be outputted when this output VCI register 38 has a negative value registered therein.

These MPU 31, VCI memory 33, queue length memory 34, weight memory 35, state register 36, input VCI register 37, and output VCI register 38 are going to exchange data through the data bus 39, and control information for data access such as address specification through the control bus 40.

Next, with reference to the flow chart shown in FIG. 4, the scheduling algorithm executed in the scheduling information management unit 16 of FIG. 3 will be described.

In FIG. 4, Enqueue (i) indicates an operation to write VCI=i into the VCI memory 33, and Dequeue indicates an operation to read the VCI from the VCI memory 33. Note that the scheduling algorithm of FIG. 4 is to be coded and stored in the ROM 32 shown in FIG. 3.

First, the MPU 31 refers to a value s of the state register 36 (step S101), and checks to see if it is s=1, s=2, or s!=1 && s!=2 (step S102).

When it is s=1 at the step S102, a value i of the VCI input register 37 is referred (step S103), and a variable q is set equal to (the queue length of the packet queue with VCI=i)+1 (step S104) while a variable w is set equal to the weight set up for the packet queue with VCI=i (step S105), and then values of the variables q and w are compared (step S106). When it is q≦w, the VCI=i is written into the VCI memory 33 (Enqueue (i) of step S107), whereas when it is q>w, this step S107 is skipped. Then, the queue length of the packet queue with VCI=i is set to the variable q (step S108).

When it is s=2 at the step S102, the VCI is read from the VCI memory 33 and set to a variable i (Dequeue of step S109), and whether this variable i is less than 0 or not is checked (step S110). When it is i≧0 at the step S110, a larger one of (the queue length of the packet queue with VCI=i)−1 and 0 is set to the variable q (step S111) while the weight set for the packet queue with VCI=i is set to the variable w (step S112), and then values of the variables q and w are compared (step S113). When it is q≧w, the VCI=i is written into the VCI memory 33 (Enqueue (i) of step S114), whereas when it is q<w, this step S114 is skipped. Then, the queue length of the packet queue with VCI=i is set to the variable q (step S115), and a value of the VCI output register 38 is set to the variable i (step S116). When it is i<0 at the step S110, the steps S111 to S115 are skipped.

After the step S108 in a case of s=1 or the step S116 in a case of s=2, or when it is s!=1 && s!=2 at the step S102, the value of the state register 36 is set equal to 0 (step S117) and the operation returns to the step S101 to repeat the operation described above.

By means of this scheduling algorithm of FIG. 4, the above described equation (4) always holds for a number ni of VCI=i held as the scheduling information in the VCI memory 33 of the scheduling information management unit 16 in this second embodiment.

As described, according to this second embodiment, the queue length and the weight set up for each one of the packet queues 12, 13, 14 are compared, and as many VCIs 21 as a smaller one of the queue length and the weight set up for each packet queue is held as the scheduling information in the VCI memory 33 of the scheduling information management unit 16, so that the processing time required for the scheduling can be made constant, regardless of a number of VC connections, in addition to the provision of small delay jitters.

Figure 5A:
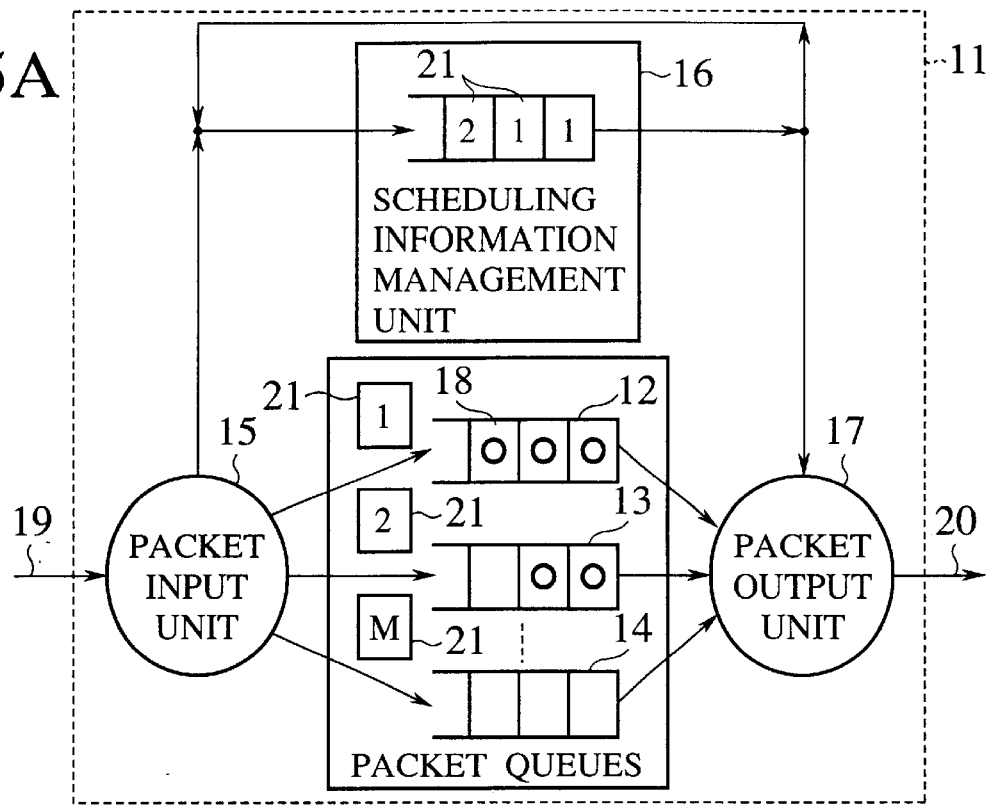
FIGS. 5A and 5B are block diagrams of a packet scheduling apparatus according to the third embodiment of the present invention, in two different states.
Figure 5B:
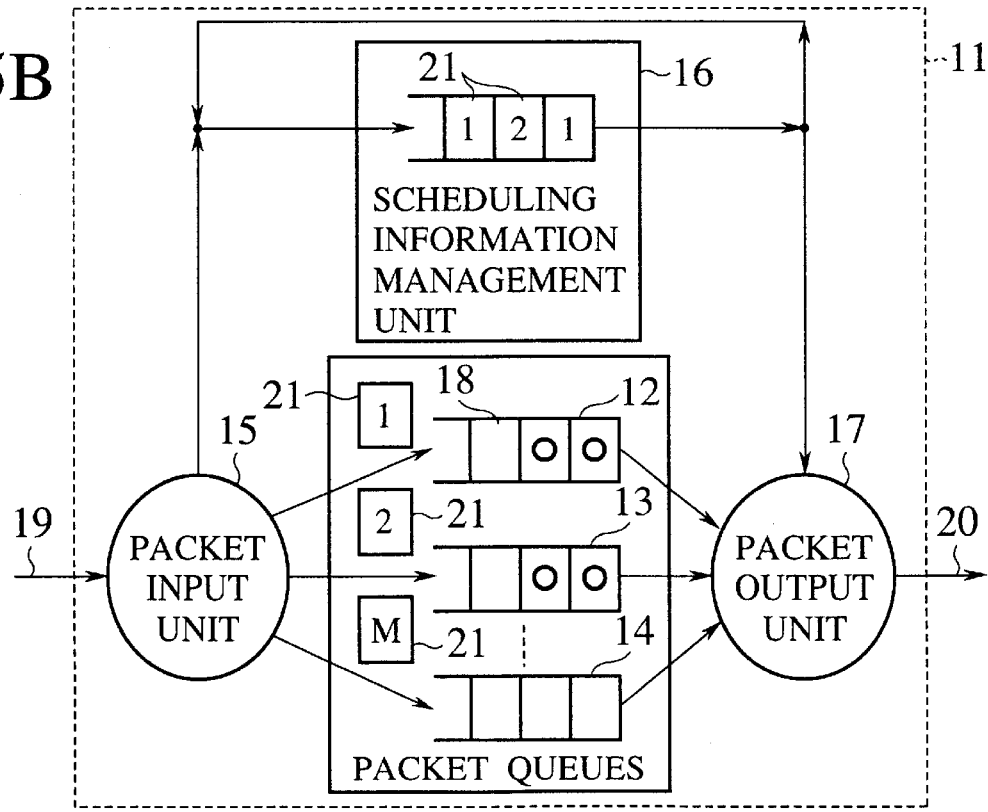

Referring now to FIG. 5A and FIG. 5B, the third embodiment of a method and an apparatus for packet scheduling according to the present invention will be described in detail.

This third embodiment is directed to a case in which the scheduling information management unit 16 of the second embodiment described above is formed by a FIFO queue.

In FIG. 5A and FIG. 5B, the packets are to be outputted from the packet queues 12, 13, 14 in an order of VCI=1, 1, 2. Here, in a case where the scheduling information management unit 16 has a FIFO queue configuration using a linked list, Enqueue (i) in the algorithm shown in FIG. 4 indicates an operation to add i at an end of the list, and Dequeue in the algorithm shown in FIG. 4 indicates an operation to take out a value from a top of the list and update a top of the list. When the list is empty, Dequeue will take a negative value.

First, an exemplary operation in a case where a packet is entered from the packet input unit 15 will be described.

In a state shown in FIG. 5A, when a packet of VCI=M is entered from the packet input unit 15, the VCI=M is added at an end of the list in the scheduling information management unit 16 because the queue length qM of the packet queue 14 corresponding to the VCI=M and the weight wM set up for this packet queue 14 are in a relationship of qM=1<wM=3 immediately after the packet input.

Also, in a state shown in FIG. 5A, when a packet of VCI=1 is entered from the packet input unit 15, the VCI=1 is not added at an end of the list in the scheduling information management unit 16 because the queue length q1 of the packet queue 12 corresponding to the VCI=1 and the weight w1 set up for this packet queue 12 are in a relationship of q1=4>w1=2 immediately after the packet input.

Next, an exemplary operation in a case where a packet is outputted from the packet output unit 17 will be described. Here, it is assumed that w1=2 and w3=3.

In a state shown in FIG. 5A, when a packet of VCI=1 is outputted from the packet output unit 17, q1=w1=2 immediately after the packet output, so that the VCI=1 is entered into the scheduling information management unit 16 again. At this point, the VCI=1 is added to an end of the list in the scheduling information management unit 16, to put the packet scheduling apparatus 11 in a state shown in FIG. 5B.

Next, a packet of VCI=1 is outputted from the packet output unit 17 in a state shown in FIG. 5B, but q1=1<w=2 immediately after the packet output this time, so that the VCI=1 is not entered into the scheduling information management unit 16 again.

As described, according to this third embodiment, the scheduling information management unit 16 is formed by a FIFO queue, so that the hardware configuration of the scheduling information management unit 16 can be simplified, while the processing time required for the scheduling of the packets becomes constant regardless of a number of VC connections just as in the second embodiment described above.

Referring now to FIG. 6 and FIG. 7, the fourth embodiment of a method and an apparatus for packet scheduling according to the present invention will be described in detail.

This fourth embodiment is directed to a case in which the scheduling information management unit 16 manages the scheduling information for each class separately. Here, the classes can be any of rate classes, service classes, or their combination. Note also that this fourth embodiment is equally applicable to a case in which the scheduling information management unit 16 manages the scheduling information for each virtual path separately.

FIG. 6 shows an exemplary configuration of the scheduling information management unit 16 of this fourth embodiment, which differs from the configuration of FIG. 3 for the second embodiment described above in that a class register 61 is provided in addition. The other elements of this scheduling information management unit 16 of FIG. 6 are similar to the corresponding elements of FIG. 3 as indicated by giving the same reference numerals in both FIG. 3 and FIG. 6.

The class register 61 is a register for registering a class number of a class to which a packet belongs, which is to be registered by an external device (not shown) and referred by the MPU 31. In this case, the VCI memory 33 is formed by a RAM to provide queues for storing VCIs for different classes separately. The input VCI read from the input VCI register 37 is written into a queue provided inside the VCI memory 33 which corresponds to a class indicated by the class number read from the class register 61.

Next, with reference to the flow chart shown in FIG. 7, the scheduling algorithm executed in the scheduling information management unit 16 of FIG. 6 will be described.

In FIG. 7, Enqueue (c, i) indicates an operation to write VCI=i into a class by class queue corresponding to a class c in the VCI memory 33, and Dequeue (c) indicates an operation to read the VCI from a class by class queue corresponding to a class c in the VCI memory 33. Also, "Select Class" is a function which returns a class number of a class from which the VCI should be outputted. When the class by class queue is empty, this function "Select Class" returns a negative value as the class number. Note that the scheduling algorithm of FIG. 7 is to be coded and stored in the ROM 32 shown in FIG. 6.

First, the MPU 31 refers to a value s of the state register 36 (step S201), and checks to see if it is s=1, s=2, or s!=1 && s!=2 (step S202).

When it is s=1 at the step S202, a value c of the class register 61 and a value i of the VCI input register 37 are sequentially referred (steps S203 and S204), and a variable q is set equal to (the queue length of the packet queue with VCI=i)+1 (step S205) while a variable w is set equal to the weight set up for the packet queue with VCI=i (step S206), and then values of the variables q and w are compared (step S207). When it is q≤w, the VCI=i is written into the class by class queue corresponding to the class c in the VCI memory 33 (Enqueue (c, i) of step S208), whereas when it is q>w, this step S208 is skipped. Then, the queue length of the packet queue with VCI=i is set to the variable q (step S108).

When it is s=2 at the step S202, a variable c is set equal to "Select Class", i.e., a class number of a class from which the VCI should be outputted (step S210), and whether this variable c is less than 0 or not is checked (step S211).

When it is c≧0 at the step S211, the VCI is read from the class by class queue corresponding to the class c in the VCI memory 33 and set to a variable i (Dequeue (c) of step S212), and whether this variable i is less than 0 or not is checked (step S213). When it is i≧0 at the step S213, a larger one of (the queue length of the packet queue with VCI=i)—1 and 0 is set to the variable q (step S214) while the weight set for the packet queue with VCI=i is set to the variable w (step S215), and then values of the variables q and w are compared (step S216). When it is q≧w, the VCI=i is written into the class by class queue corresponding to the class c in the VCI memory 33 (Enqueue (c, i) of step S217), whereas when it is q<w, this step S217 is skipped. Then, the queue length of the packet queue with VCI=i is set to the variable q (step S218), and a value of the VCI output register 38 is set to the variable i (step S219).

When it is c<0 at the step S211, the steps S212 to S218 are skipped, while when it is i<0 at the step S213, the steps S214 to S218 are skipped.

After the step S209 in a case of s=1 or the step S219 in a case of s=2, or when it is s!=1 && s!=2 at the step S202, the value of the state register 36 is set equal to 0 (step S220) and the operation returns to the step S201 to repeat the operation described above.

When the function "Select Class" selects the class periodically in a prescribed order, this scheduling algorithm of FIG. 7 can realize a time division multiplex (TDM) like scheduling with respect to the classes.

Also, in a case of carrying out the WFQ according to a smaller one of the queue length and the weight values with respect to the classes as well, the packet scheduling apparatus can provide a class scheduling queue, a class by class cell number counter, and a class by class weight for the purpose of scheduling of classes. Then, when a value of the class by class cell number counter for the class c is not less than one, the function "Select Class" outputs one class number from the class scheduling queue while decrementing the class by class cell number counter for the class c. On the other hand, when a value of the class by class cell number counter for the class c is 0, the function "Select Class" outputs a negative value.

In this case, in addition to the operation to write VCI=i into a class by class queue corresponding to a class c in the VCI memory 33, Enqueue (c, i) should carry out an operation to increment the class by class cell number counter for the class c if s=1 or decrement the class by class cell number counter for the class c is s=2, and write the class number c into the class scheduling queue when the state register value is s=1 and the cell number for the class c is not greater than the weight, or when the state register value is s=2 and the cell number for the class c is not less than the weight.

Note that it is also possible to utilize the conventional scheme such as SCFQ and Virtual Clock for the scheduling of classes.

Also, in a case of carrying out the priority class scheduling in which the class with the highest priority level is to be served first among the classes for which at least one packet is stored, there is no need to provide class by class weights.

By means of this scheduling algorithm of FIG. 7, the above described equation (4) always holds for a number ni of VCI=i held in the VCI memory 33 of the scheduling information management unit 16, while the independent scheduling for each class is realized in this fourth embodiment.

As described, according to this fourth embodiment, the similar effects as in the first to third embodiments described above can be obtained for both the packet scheduling among classes and the packet scheduling among connections of the same class, by managing the VCI for each class of packet separately as the scheduling information in the scheduling information management unit 16.

Referring now to FIG. 8A to 8D and FIG. 9A to FIG. 9C, the fifth embodiment of a method and an apparatus for packet scheduling according to the present invention will be described in detail.

FIG. 8A to 8D show an exemplary configuration of the packet scheduling apparatus 11 of this fifth embodiment in four different states, which differs from the configuration shown in FIG. 2 and FIG. 5 described above in that random out queues 81 and 82 and queue selectors 83 and 84 are provided in the scheduling information management unit 16. The other elements of this packet scheduling apparatus of FIG. 8A to FIG. 8D are similar to the corresponding elements shown in FIG. 2 and FIG. 5 and given the same reference numerals in FIG. 8A to FIG. 8D.

The queue selector 83 selects one of the random out queues 81 and 82 to which the scheduling information is to be stored, while the queue selector 84 selects one of the random out queues 81 and 82 from which the scheduling information is to be taken out. Here, when the queue selector 83 selects the random out queue 81, the queue selector 84 selects the random out queue 82, and conversely when the queue selector 83 selects the random out queue 82, the queue selector 84 selects the random out queue 81. In other words, the queue selectors 83 and 84 are controlled to select mutually different random out queues all the times. Note that the configuration shown in FIG. 8A to FIG. 8D uses only two random out queues 81 and 82, but it is also possible to provide more than two random out queues if desired.

Each of the random out queues 81 and 82 randomly outputs the scheduling information stored therein when selected by the queue selector 84. When all the scheduling informations are taken out from the random out queue selected by the queue selector 84, each one of the queue selectors 83 and 84 is controlled to change the selection to another currently not selected random queue.

The basic operation of the scheduling information management unit 16 in this fifth embodiment is similar to that of the flow chart shown in FIG. 4 described above, except that the meanings of Enqueue (i) and Dequeue are different from the second embodiment described above.

In FIG. 8A to FIG. 8D, the packet queues 12, 13, 14 correspond to the VCI=1, 2, M, respectively, and their corresponding connections have weights w1=2, w2=1, wM=1, respectively. In a state shown in FIG. 8A, all the packet queues 12, 13, 14 store packets, and their scheduling informations are stored in the random out queue 81 in the scheduling information management unit 16. In this state, the queue selector 83 is selecting the random out queue 81 and the queue selector 84 is selecting the random out queue 82.

At a time of the packet output, the random out queue 82 currently selected by the queue selector 84 is empty, so that the queue selector 83 switches its selection to the random out queue 82, and the queue selector 84 switches its selection to the random out queue 81. At this point, suppose that the VCI=2 is outputted as a result of selecting the VCI randomly from the random out queue 81, then because q2=0<w2=1 in this case, the VCI=2 is not entered into the scheduling information management unit 16 again, and the packet scheduling apparatus 11 makes a transition from a state shown in FIG. 8A to a state shown in FIG. 8B.

In a state shown in FIG. 8B, when one packet arrives at the packet queue corresponding to VCI=1, because q1=1<w1=2 in this case, so that one VCI=1 is newly entered into the random out queue 82, and the packet scheduling apparatus 11 makes a transition from a state shown in FIG. 8B to a state shown in FIG. 8C.

In a state shown in FIG. 8C, when one packet arrives at the packet queue corresponding to VCI=2 and then two identifies VCI=1, M are randomly selected from the random out queue 81, the packet scheduling apparatus 11 makes a transition from a state shown in FIG. 8C to a state shown in FIG. 8D. At this point, the random out queue 81 becomes empty, so that the queue selectors 83 and 84 switch their selections to different random out queues.

By means of this control, for the weights with quite large values such as w1=100 and w2=200, for example, it is possible to eliminate the drawback that it is rather hard to realize a weighted fair scheduling in a short time scale when the scheduling information management unit 16 has a FIFO configuration as in the third embodiment described above, and it becomes possible to realize a weighted fair scheduling which is always probabilistic with respect to any weight value. In addition, while the scheduling information is outputted from one random out queue, another scheduling information is inputted into another random out queue, so that it is possible to guarantee that packets at tops of all the non-empty packet queues will be outputted within a certain period of time.

Figure 9A:
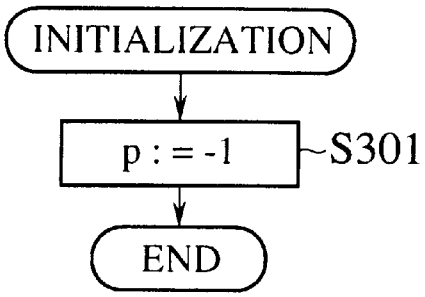
FIGS. 9A, 9B and 9C are flow charts of an algorithm for realizing random out queues used in the packet scheduling apparatus of FIGS. 8A to 8D.
Figure 9B:
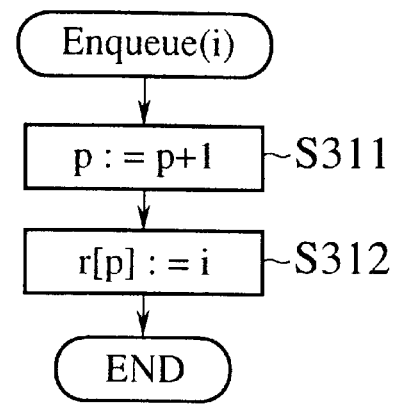
Figure 9C:
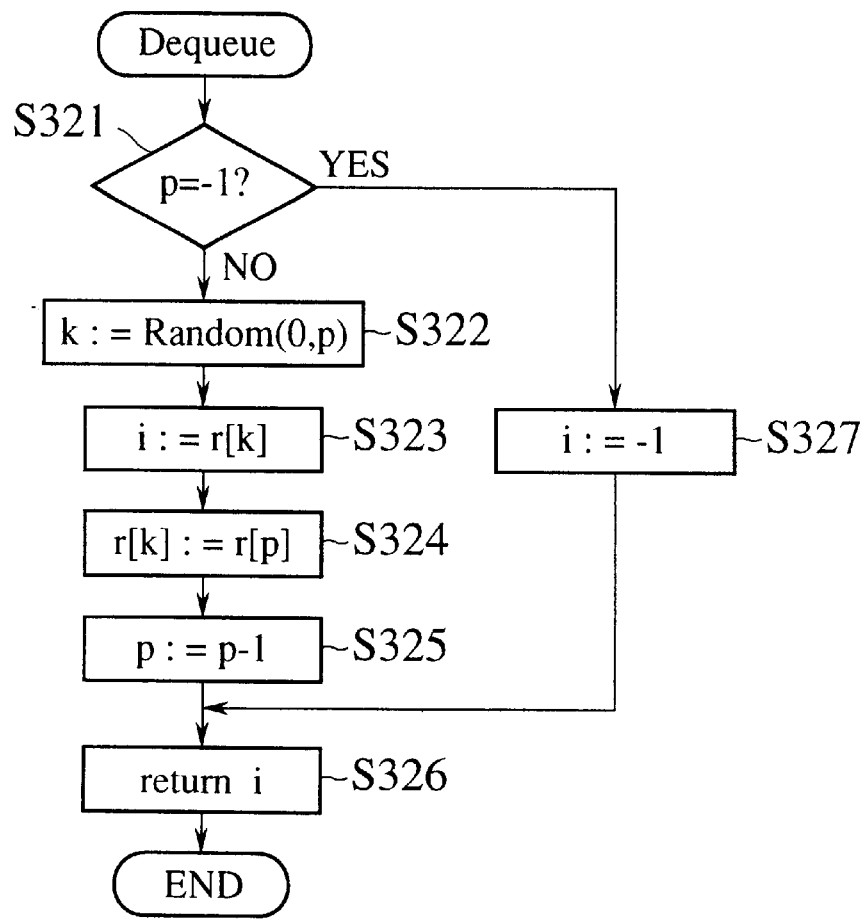

The random out queues 81 and 82 of this fifth embodiment can be realized by the algorithm of the flow charts shown in FIG. 9A to FIG. 9C as follows. In FIG. 9A to FIG. 9C, r represents an array, and p represents a pointer for pointing an end of an array r.

First, as the initialization processing, the pointer p is set to −1 (step S301 of FIG. 9A).

Then, Enqueue (i) operation is realized by incrementing the pointer p by one (step S311 of FIG. 9B) and then setting r[p] to a variable i (step S312 of FIG. 9B).

On the other hand, Dequeue operation is realized according to the flow chart of FIG. 9C as follows.

First, whether the pointer p is equal to −1 or not is checked (step S321). When the pointer p is equal to −1, it implies that the queue is empty, so that a return value −1 is set to the variable i (step S327). Otherwise, a psuedo random integer (Random (0, p)) between 0 and p is set to a variable k (step S322), and then the variable i is set equal to r[k] so as to set a return value of Dequeue to the variable i (step S323). Then, r[k] is set equal to r[p] so as to move a value at the end of the queue to a position k (step S324), and then the pointer p is decremented by one (step S325). Finally, a value of the variable i is returned (step S326).

By means of this algorithm of FIG. 9A to FIG. 9C, it is possible to realize a management of the random out queues with a simple configuration.

Figure 10:
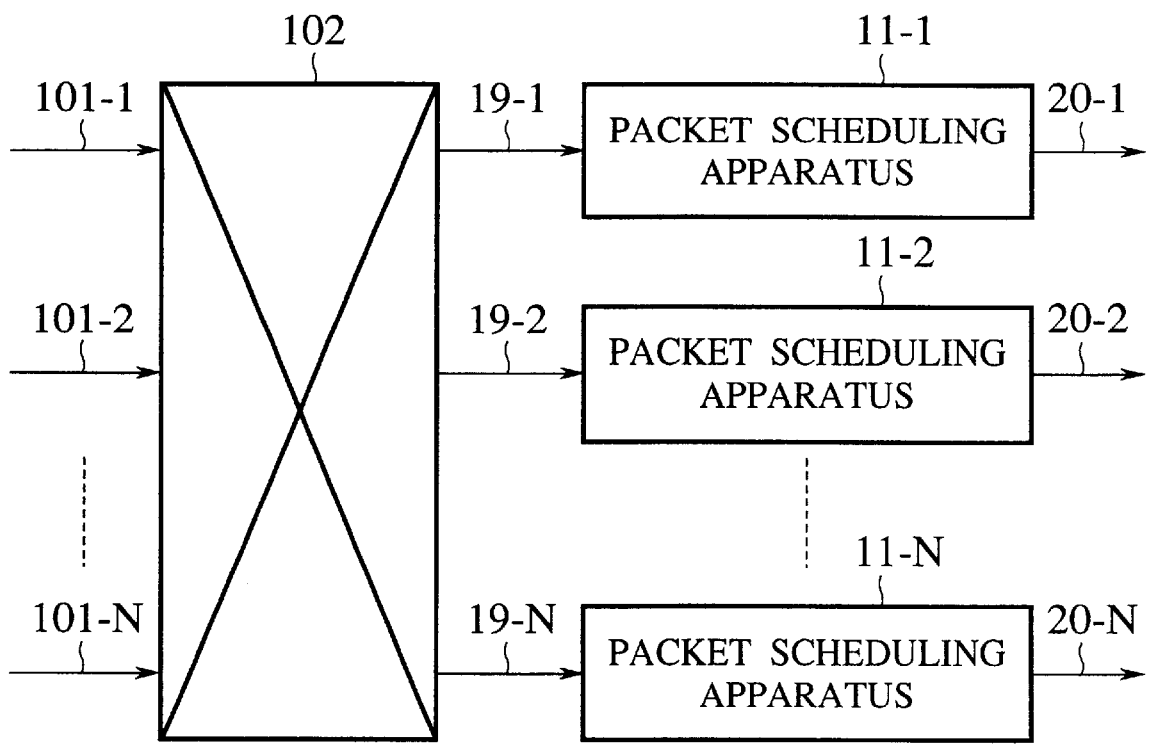
FIG. 10 is a schematic block diagram of an output buffer type ATM switch according to the sixth embodiment of the present invention, which utilizes the packet scheduling apparatus of the present invention.

Referring now to FIG. 10, the sixth embodiment of a method and an apparatus for packet scheduling according to the present invention will be described in detail.

This sixth embodiment is directed to a case in which the packet scheduling apparatus of the present invention is applied to an output buffer type ATM switch. Note that the packet scheduling apparatus of the present invention is equally applicable to the other switch architectures such as the input buffer type, the common buffer type, and any combination of these types.

FIG. 10 shows a configuration of the output buffer type ATM switch in this sixth embodiment, in which fixed length packets in forms of ATM cells arrive at cell input lines 101-1 to 101-N. The arrived ATM cells are then exchanged at a switch 102 according to their header information, and entered into the packet scheduling apparatuses 11-1 to 11-N according to the present invention, through packet input lines 19-1 to 19-N.

Each one of the packet scheduling apparatuses 11-1 to 11-N has queues corresponding to VC connections as packet storage units, and an entered cell is stored into a queue corresponding to the VCI written in the header of that cell.

At each cell cycle, each one of the packet scheduling apparatuses 11-1 to 11-N selectively outputs one cell among cells buffered in the queues, to corresponding one of packet output lines 20-1 to 20-N.

Figure 11A:
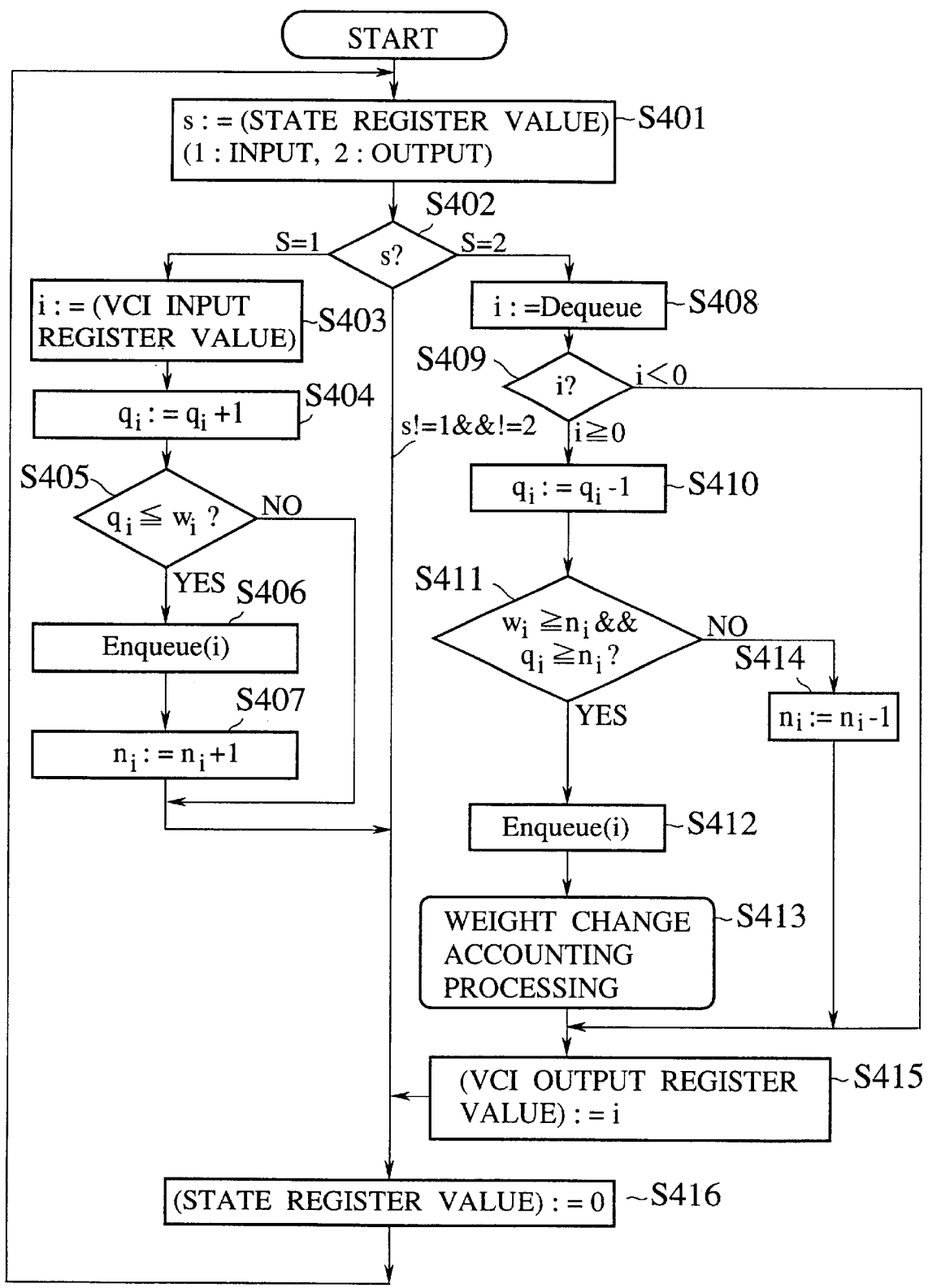
FIGS. 11A and 11B are flow charts of the scheduling algorithm executed in a packet scheduling apparatus according to the seventh embodiment of the present invention.
Figure 11B:
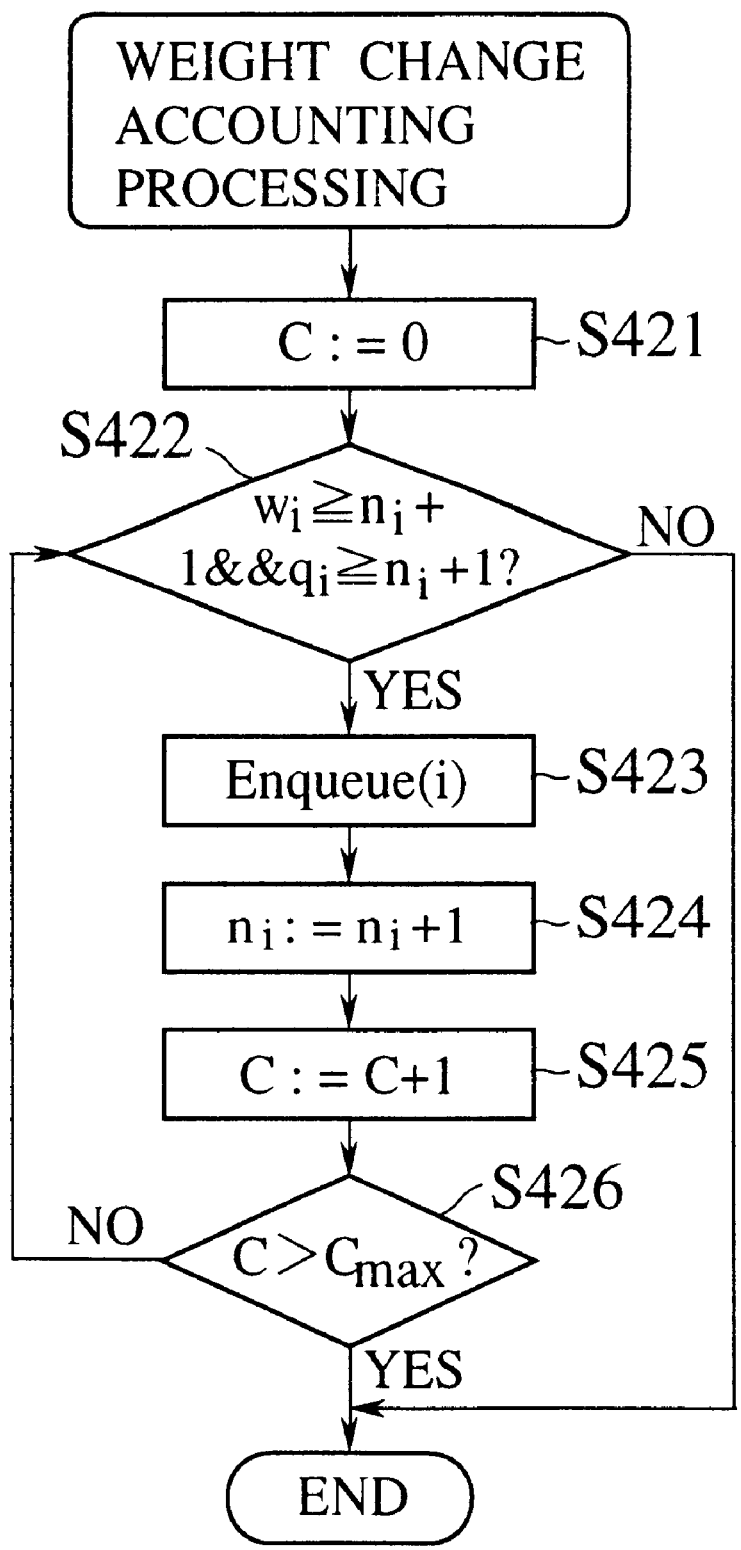

Referring now to FIG. 11A and FIG. 11B, the seventh embodiment of a method and an apparatus for packet scheduling according to the present invention will be described in detail.

This seventh embodiment is directed to an operation of the scheduling information management unit 16 in a case of dynamically varying weights. In this case, the configuration of the scheduling information management unit 16 is similar to that shown in FIG. 3 described above.

In a case of dynamically varying weights, a number $n_i$ of VCI=i held in the scheduling information management unit 16 may not satisfy the above described equation (4) temporarily. Consequently there is a need to count the number $n_i$ of VCI=i held in the scheduling information management unit 16. Then, the number $n_i$ is changed at a time of input or output of the scheduling information at the scheduling information management unit 16.

In a case of judging whether or not to enter VCI=i into a scheduling queue at a time of cell output, instead of comparing the weight and the queue length, the weight $w_i$ and the number $n_i$ of VCI=i in the scheduling queue are compared while the queue length $q_i$ and the number $n_i$ of VCI=i in the scheduling queue are also compared, and VCI=i is entered into the scheduling queue when $w_i \geq n_i$ and $q_i \geq n_i$. In this manner, even when it becomes $w_i > q_i$ as a result of an increase of the weight, VCI=i can be entered into the scheduling queue in the cell output phase.

More specifically, the scheduling algorithm in this seventh embodiment is carried out according to the flow chart of FIG. 11A as follows.

First, the MPU 31 refers to a value s of the state register 36 (step S401), and checks to see if it is s=1, s=2, or s!=1 && s!=2 (step S402).

When it is s=1 at the step S402, a value i of the VCI input register 37 is referred (step S403), and the queue length $q_i$ of the packet queue with VCI=i is incremented by one (step S404), and then this $q_i$ is compared with the weight $w_i$ set up for the packet queue with VCI=i (step S405). When it is $q_i \leq w_i$, the VCI=i is written into the VCI memory 33 (Enqueue (i) of step S406), and the number $n_i$ of VCI=i held in the scheduling information management unit 16 is incremented by one (step S407), whereas when it is $q_i > w_i$, these steps S406 and S407 are skipped.

When it is s=2 at the step S402, the VCI is read from the VCI memory 33 and set to a variable i (Dequeue of step S408), and whether this variable i is less than 0 or not is checked (step S409). When it is $i \geq 0$ at the step S409, the queue length $q_i$ of the packet queue with VCI=i is decremented by one (step S410). Then, the weight $w_i$ set for the packet queue with VCI=i and the queue length $q_i$ of the packet queue with VCI=i are compared with the number $n_i$ of VCI=i held in the scheduling information management unit 16 (step S411). When it is $w_i \geq n_i$ and $q_i \geq n_i$, the VCI=i is written into the VCI memory 33 (Enqueue (i) of step S412), and the weight change accounting processing to be described below is carried out (step S413), whereas otherwise the number $n_i$ of VCI=i held in the scheduling information management unit 16 is decremented by one (step S414). Then, a value of the VCI output register 38 is set to the variable i (step S415). When it is i<0 at the step S409, the steps S410 to S414 are skipped.

After the step S407 in a case of s=1 or the step S415 in a case of s=2, or when it is s!=1 && s!=2 at the step S402, the value of the state register 36 is set equal to 0 (step S416) and the operation returns to the step S401 to repeat the operation described above.

In the scheduling algorithm of FIG. 11A, the weight change accounting processing at the step S413 is included because when wi is increased while wi<qi, it is necessary to increase the number ni of VCI=i held in the scheduling information management unit 16 as much as the weight wi is increased. Note that FIG. 11A shows a case in which this weight change accounting processing is carried out at a time of cell output, but it is also possible to carry out this weight change accounting processing at a time of cell input, or at a time of cell input as well as at a time of cell output, or else at each cell period.

More specifically, the weight change accounting processing according to the flow chart of FIG. 11B is carried out as follows.

First, a value of a variable C is set equal to 0 (step S421), and the weight wi set for the packet queue with VCI =i and the queue length qi of the packet queue with VCI=i are compared with (the number ni of VCI=i held in the scheduling information management unit 16)+1 (step S422). When it is wi≧ni+1 and qi≧ni+1, the VCI=i is written into the VCI memory 33 (Enqueue (i) of step S423), and the number ni of VCI=i held in the scheduling information management unit 16 is incremented by one (step S424), while the variable C is incremented by one (step S425), and this operation is repeated until the variable C exceeds a prescribed maximum value Cmax (step S426). Otherwise, the steps S423 to S426 are skipped.

Here, the maximum value Cmax indicates a prescribed maximum number of loops in this weight change accounting processing which can take place in a single processing of this weight change accounting processing, so that the loops beyond this maximum number Cmax will be carried out at the subsequent cell periods. The step S426 is provided because a number of loops in this weight change accounting processing will be increased more for a larger change in the weight.

Referring now to FIG. 12A to FIG. 12D, the eighth embodiment of a method and an apparatus for packet scheduling according to the present invention will be described in detail.

This eighth embodiment is directed to an operation of the scheduling information management unit 16 in a case where the weights can take real number values. In this case, the configuration of the scheduling information management unit 16 is similar to that shown in FIG. 3 described above.

In this eighth embodiment, the weight wi takes a real number value not less than 1. At a time of comparison of the weight and the queue length, a variable $w_{inow}$ is used. This variable $w_{inow}$ is controlled such that a function floor($w_{inow}$) takes a value of either floor(wi) or floor(wi)+1, and an average value of wi now becomes equal to wi, where a function floor(x) is a function which returns a maximum integer value not greater than x. A value of this variable $w_{inow}$ is to be dynamically changed, so that there is a need to count the number ni of VCI=i held in the scheduling information management unit 16, similarly as in the seventh embodiment described above.

Figure 12A:
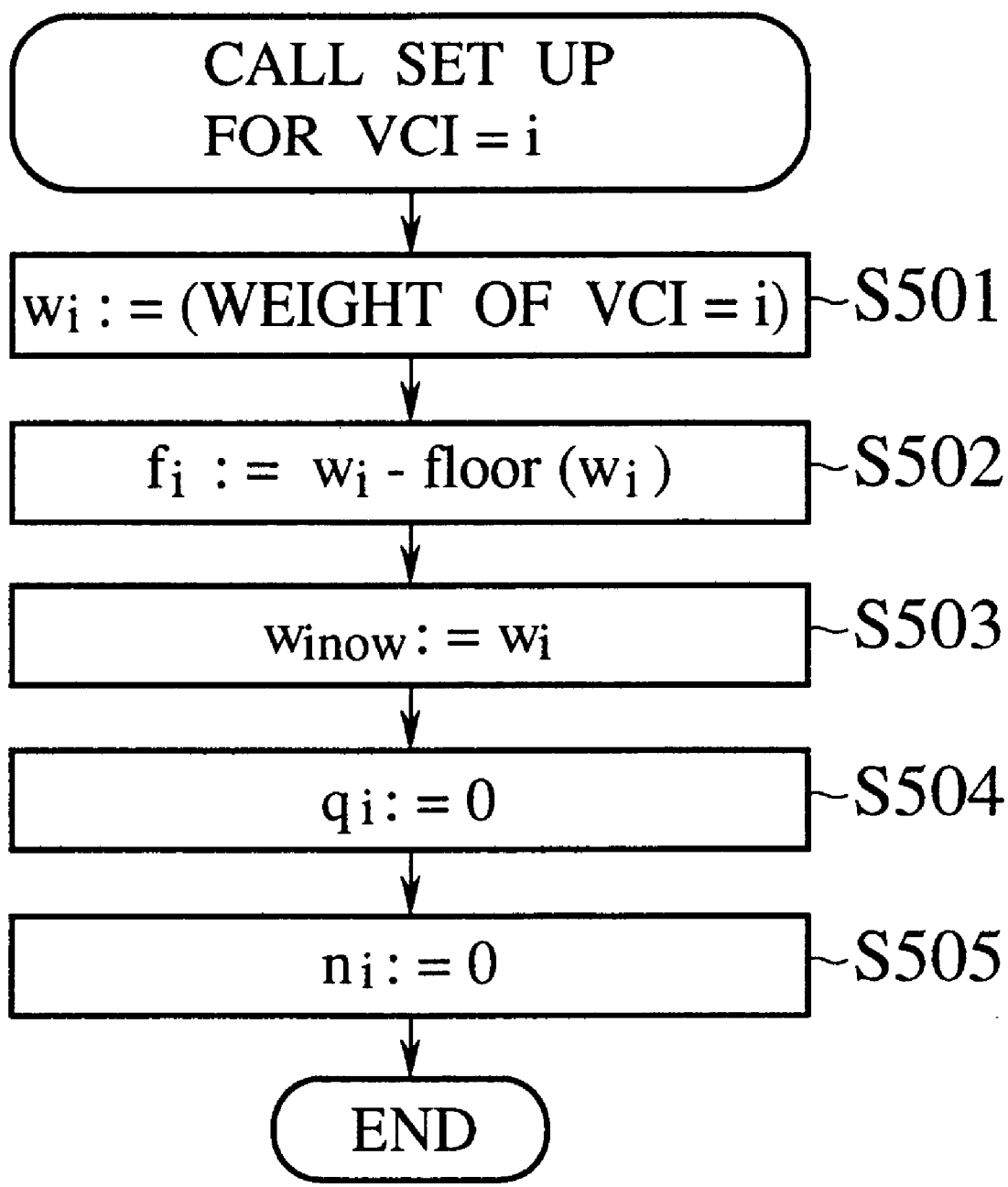
FIGS. 12A, 12B, 12C and 12D are flow charts of the scheduling algorithm executed in a packet scheduling apparatus according to the eighth embodiment of the present invention.

Now, at a time of call set up for VCI=i, the operation according to the flow chart of FIG. 12A is carried out as follows.

Namely, wi is set equal to the weight set up for the packet queue with VCI=i (step S501), and a variable fi is set equal to a decimal number portion of wi (step S502). Then, a value of the variable $w_{inow}$ is initialized to wi (step S503) while the queue length qi of the packet queue with VCI=i and the number ni of VCI=i held in the scheduling information management unit 16 are initialized to 0 (steps S504 and S505).

Then, the scheduling algorithm in this eighth embodiment is carried out according to the flow chart of FIG. 12B as follows.

First, the MPU 31 refers to a value s of the state register 36 (step S511), and checks to see if it is s=1, s=2, or s!=1 && s!=2 (step S512).

When it is s=1 at the step S512, a value i of the VCI input register 37 is referred (step S513), and the queue length qi of the packet queue with VCI=i is incremented by one (step S514), and then this qi is compared with the variable $w_{inow}$ (step S515). When it is qi≦$w_{inow}$, the VCI=i is written into the VCI memory 33 (Enqueue (i) of step S516), and the number ni of VCI=i held in the scheduling information management unit 16 is incremented by one (step S517), whereas when it is qi>$w_{inow}$, these steps S516 and S517 are skipped.

When it is s=2 at the step S512, the VCI is read from the VCI memory 33 and set to a variable i (Dequeue of step S518), and whether this variable i is less than 0 or not is checked (step S519). When it is i≧0 at the step S519, the queue length qi of the packet queue with VCI=i is decremented by one (step S520), and the decimal point processing to be described below is carried out (step S521). Then, the variable $W_{i\ now}$ and the queue length qi of the packet queue with VCI=i are compared with the number ni of VCI=i held in the scheduling information management unit 16 (step S522). When it is $w_{inow}$≧ni and qi≧ni, the VCI=i is written into the VCI memory 33 (Enqueue (i) of step S523), and the weight change accounting processing to be described below is carried out (step S524), whereas otherwise the number ni of VCI=i held in the scheduling information management unit 16 is decremented by one (step S525). Then, a value of the VCI output register 38 is set to the variable i (step S526). When it is i<0 at the step S519, the steps S520 to S525 are skipped.

After the step S517 in a case of s=1 or the step S526 in a case of s=2, or when it is s!=1 && s!=2 at the step S512, the value of the state register 36 is set equal to 0 (step S527) and the operation returns to the step S511 to repeat the operation described above.

In the scheduling algorithm of FIG. 12B, a value of the variable $w_{inow}$ is updated at a time of cell output by the decimal point processing at the step S521 which is carried out according to the flow chart of FIG. 12C as follows.

Namely, whether $w_{inow}$ is greater than or equal to floor (wi)+1 is checked (step S531), and if so, $w_{inow}$ is decremented by one (step S532) whereas otherwise this step S532 is skipped. Then, $w_{inow}$ is incremented by fi each time (step S533).

Figure 12B:
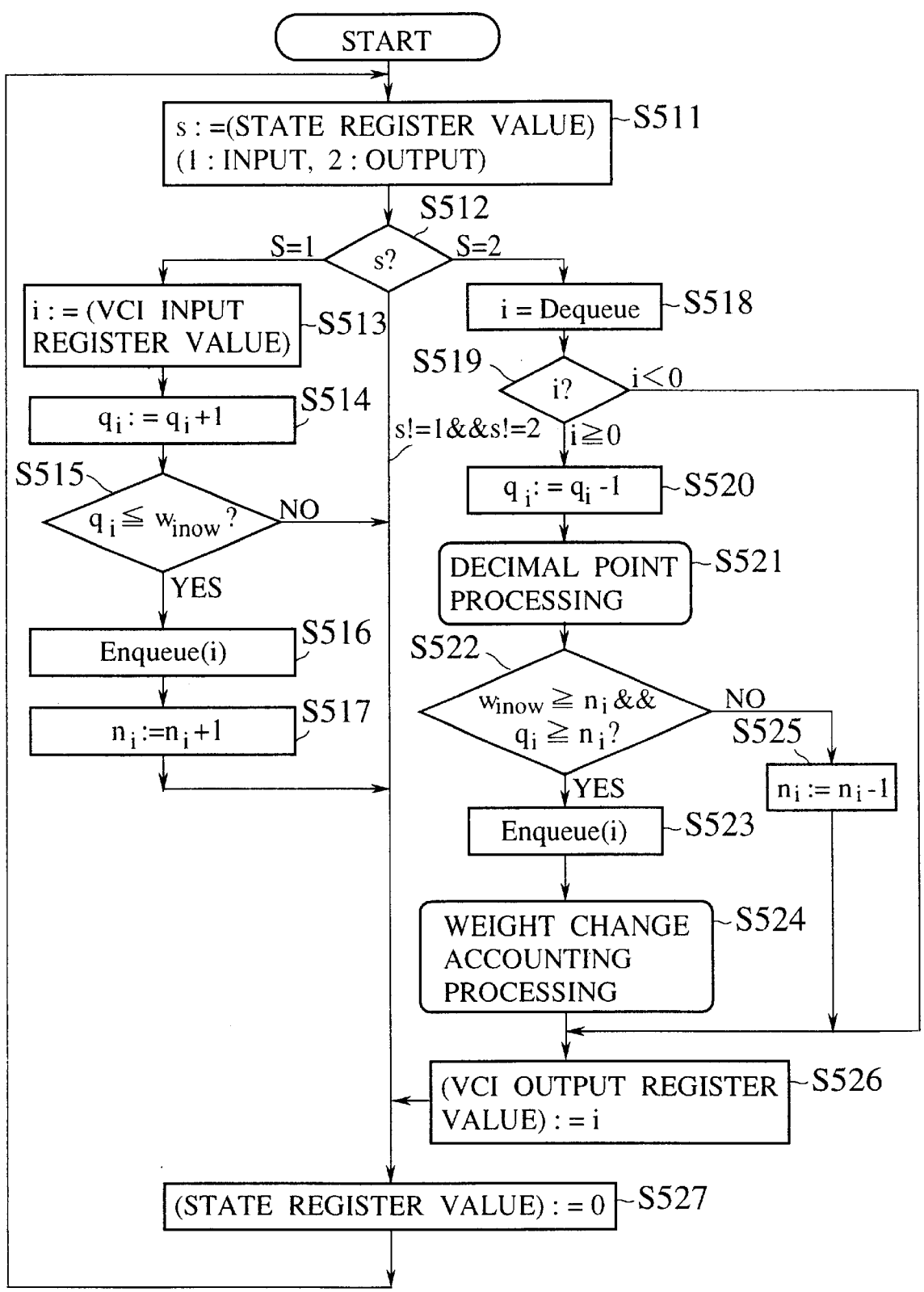
Figure 12C:
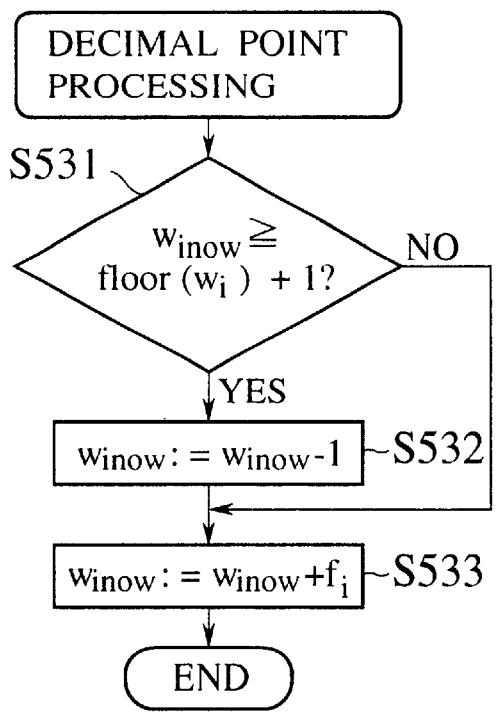

Also, in the scheduling algorithm of FIG. 12B, there is a need for the weight change accounting processing similar to that of the seventh embodiment described above but using $w_{inow}$ instead of wi, in conjunction with the dynamic change of $w_{inow}$. This weight change accounting processing at the step S524 is carried out according to the flow chart of FIG. 12D as follows.

First, a value of a variable C is set equal to 0 (step S541), and $w_{inow}$ and the queue length qi of the packet queue with VCI=i are compared with (the number ni of VCI=i held in the scheduling information management unit 16)+1 (step S542). When it is $w_{j_{now}} \geq ni+1$ and $qi \geq ni+1$, the VCI=i is written into thbe VCI memory 33 (Enqueue (i) of step S543), and the number ni of VCI=i held in the scheduling information management unit 16 is incremented by one (step S544), while the variable C is incremented by one (step S545), and this operation is repeated until the variable C exceeds a prescribed maximum value Cmax (step S546). Otherwise, the steps S543 to S546 are skipped.

Figure 12D:
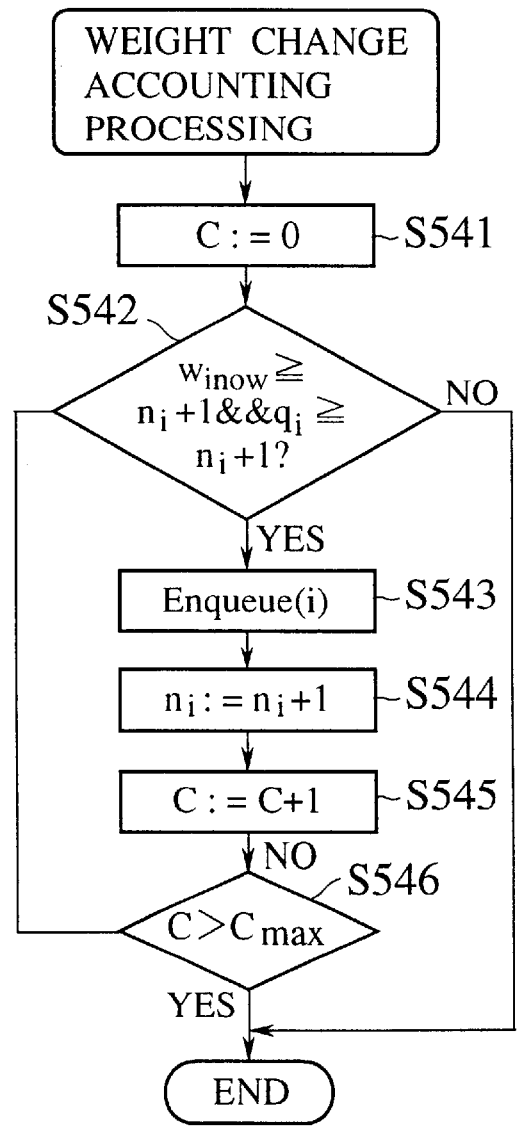

This weight change accounting processing of FIG. 12D can account for not just the dynamic change of $w_{i_{now}}$ due to the decimal point processing, but also the dynamic change of $w_{i_{now}}$ due to the dynamic change of wi as in the seventh embodiment described above.

Note that FIG. 12B shows a case in which the decimal point processing and the weight change accounting processing are carried out at a time of cell output, but it is also possible to carry out these decimal point processing and weight change accounting processing at a time of cell input, or at a time of cell input as well as at a time of cell output, or else at each cell period.

In this manner, this eighth embodiment can enable the weight to take a real number value, so that it is possible to prevent the weight to take an excessively large value, and thereby prevent the degradation of the performance of the packet scheduling apparatus.

Referring now to FIG. 13 and FIG. 14A to FIG. 14F, the ninth embodiment of a method and an apparatus for packet scheduling according to the present invention will be described in detail.

This ninth embodiment is directed to a case in which the scheduling information management unit 16 carries out the scheduling of classes according to the weights set for different classes to which packets belong, and changes a class by class weight of each class according to a state of queues for connections within that class.

Figure 13:
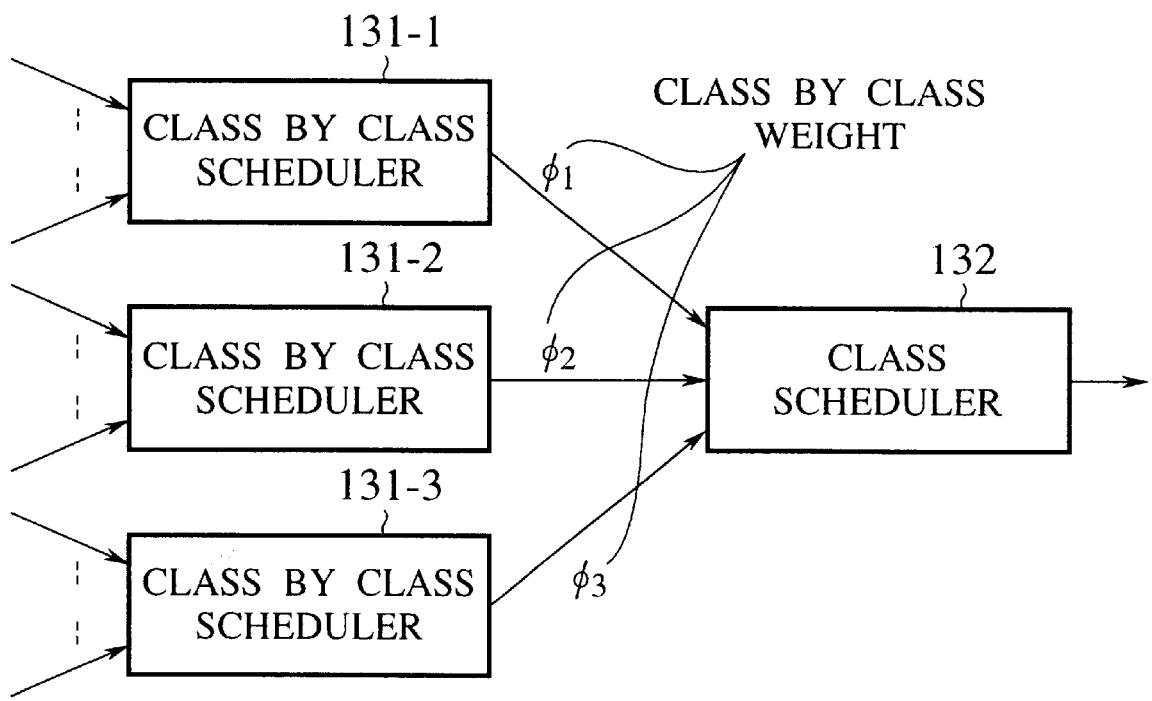
FIG. 13 is a schematic block diagram of a scheduler configuration according to the ninth embodiment of the present invention.

This ninth embodiment uses a configuration shown in FIG. 13 which comprises a plurality of class by class schedulers 131 (131-1, 131-2, 131-3) and a class scheduler 132 connected with the class by class schedulers 131. Here, the class by class schedulers 131 are provided in correspondence to any of rate classes, QOS classes, virtual paths, or their combination. Each class by class scheduler 131 carries out the scheduling using the weights and the queue lengths. This class by class scheduler 131 may be a scheduler of a conventional scheme. The class scheduler 132 is formed by the scheduling information management unit 16 similar to that shown in FIG. 6 described above.

In this configuration of FIG. 13, the class scheduler 132 manages a weight $\phi i$ of each class i. Here, the class weight $\phi i$ is controlled to satisfy the following equation (6).

$$\phi i = \sum_{j \in Bi} wj / Wi \qquad (6)$$

where Bi is a set of VCIs for which a VC queue is not empty among VCs of a class i, and Wi is a sum of wj for all connected VCs of a class i. Consequently, the class weight $\phi i$ becomes smaller for a larger number of VCs for which a packet queue is empty. By means of this, even when the scheduler has a hierarchical structure, the class scheduler 132 can carry out the scheduling which accounts for a state of VCs in a class.

Note that when a value of the class weight $\phi i$ is changed, there is a need to update a state in the class scheduler 132 according to this class weight change. For instance, when the class scheduler 132 is a scheduler which uses virtual time as in a case of SCFQ, the re-sorting of the scheduling information is to be carried out.

Next, with reference to the flow charts shown in FIG. 14A to 14F, the scheduling algorithm executed in the class scheduler 132 of FIG. 13 will be described, for an exemplary case in which the weights can take real number values and vary dynamically as in the eighth embodiment described above.

First, the initialization processing according to the flow chart of FIG. 14A is carried out, where a total weight Wi which is a sum of the weights set up for the packet queues of a class i and a queue length Qi of a class i which is a sum of the queIe lengths qi of the packet queues with VCI=j of a class i are reset to 0 for all classes (step S601).

Next, at a time of call set up for VCI=j of a class i, the operation according to the flow chart of FIG. 14B is carried out as follows.

Namely, wj is set equal to the weight set up for the packet queue with VCI=j (step S611), and a variable fj is set equal to a decimal number portion of wj (step S612). Then, a value of the variable $w_{j_{now}}$ is initialized to wj (step S613) while the queue length qj of the packet queue with VCI=j and the number nj of VCI=j held in the scheduling information management unit 16 are initialized to 0 (steps S614 and S615). In addition, the total weight Wi of the class i is incremented by wj (step S616).

On the other hand, at a time of call disconnect for VCI=j of a class i, the operation according to the flow chart of FIG. 14C is carried out, where the total weight Wi of the class i is decremented by wj (step S621).

Figure 14E:
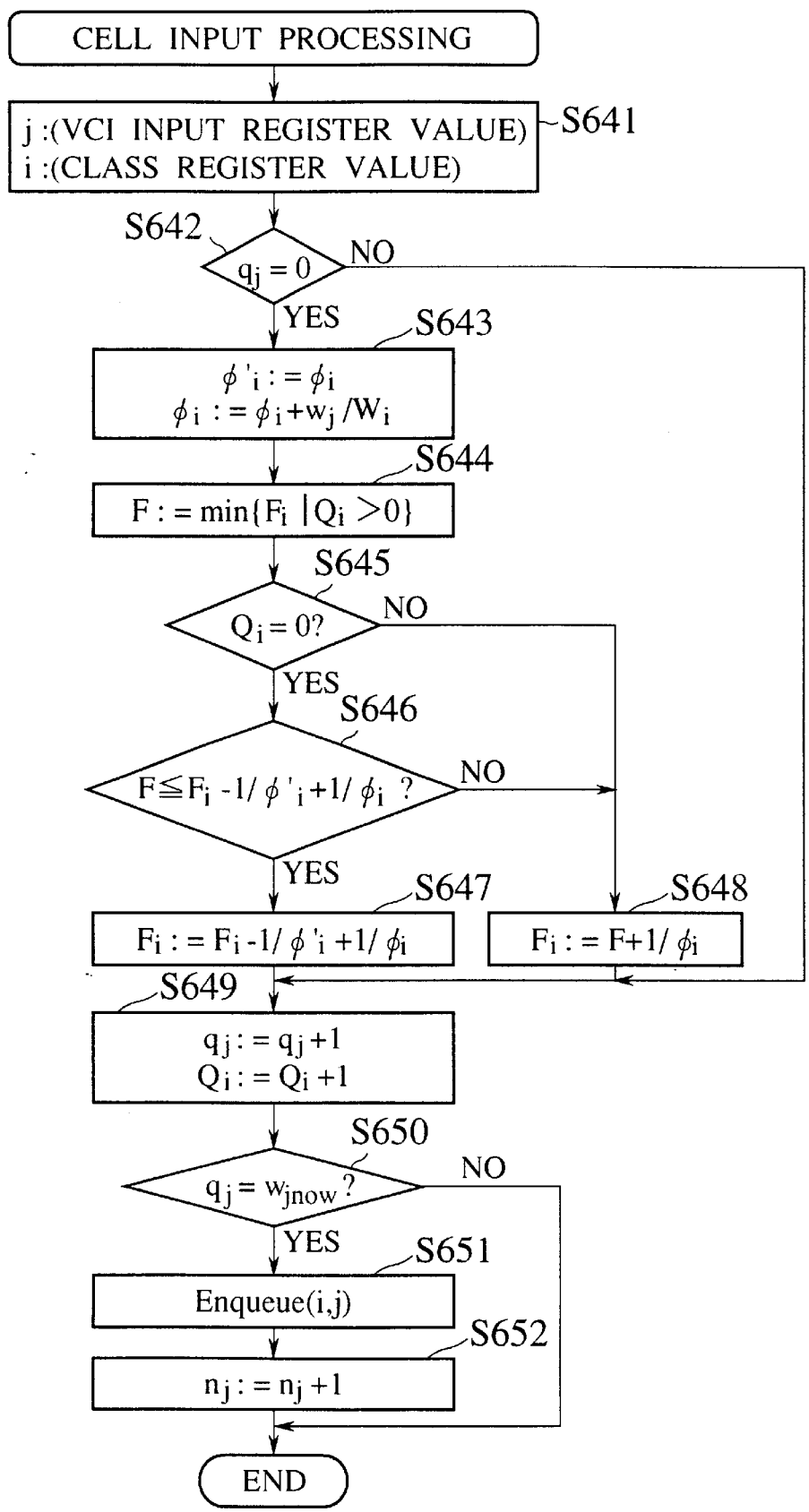
Figure 14F:
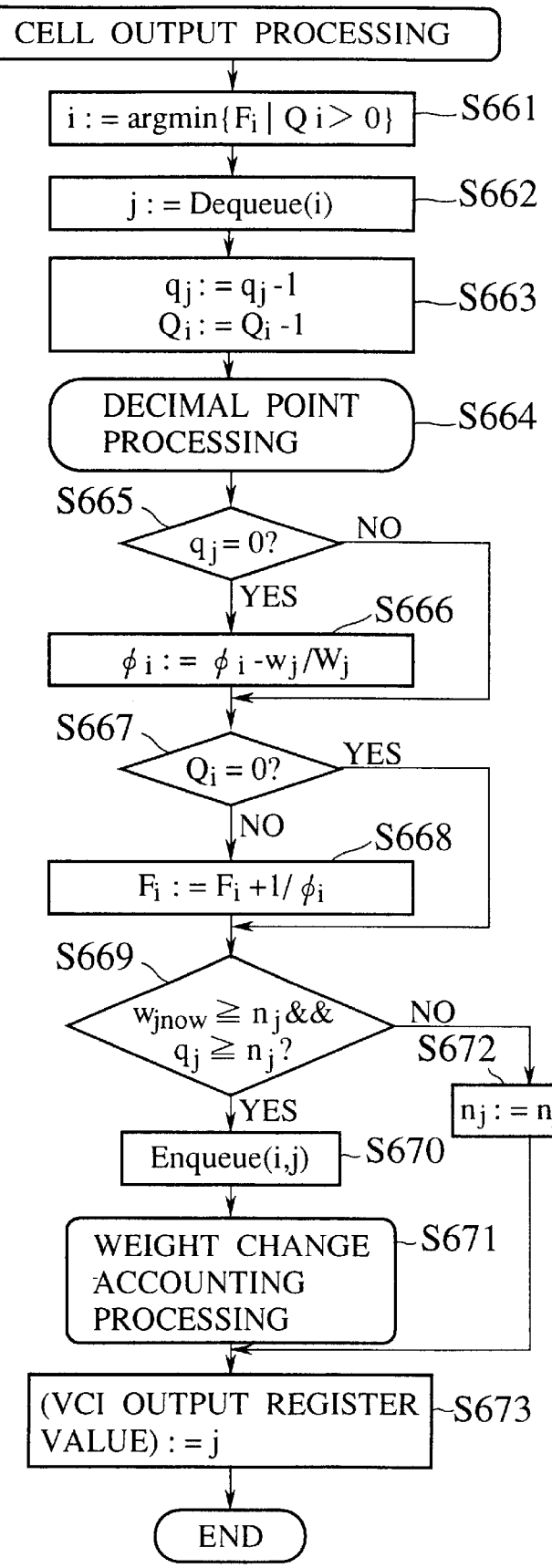

Next, at a time of cell transfer, the operation according to the flow charts of FIG. 14D to FIG. 14F is carried out as follows.

First, the MPU 31 refers to a value s of the state register 36 (step S631), and checks to see if it is s=1, s=2, or s!=1 && s!=2 (step S632).

When it is s=1 at the step S632, the cell input processing according to the flow chart of FIG. 14E to be described below is carried out (step S633).

When it is s=2 at the step S632, the cell output processing according to the flow chart of FIG. 14F to be described below is carried out (step S634).

After the cell input processing at the step S633 or the cell output processing at the step S634, or when it is s!=1 && s!=2 at the step S632, the value of the state register 36 is set equal to 0 (step S635) and the operation returns to the step S631 to repeat the operation described above.

The cell input processing at the step S633 is carried out according to the flow chart of FIG. 14E as follows.

First, a value j of the VCI input register 37 and a value i of the class register 61 are referred (step S641), and whether the queue length qj of the packet queue with VCI=j for the class i is equal to 0 or not is checked (step S642).

When it is qj=0 at the step S642, the current class weight $\phi i$ of the class i is set to a variable $\phi'i$, while the class weight $\phi i$ of the class i is incremented by wj/Wi (step S643).

Then, an evaluation value Fi of the class i is updated in accordance with this change of the class weight $\phi i$. Namely, a variable F is set to the smallest value among the currently sorted evaluation values Fi, i.e., those evaluation values Fi for which the queue length Qi is greater than 0 (step S644), and whether the queue length Qi of the class i is equal to 0 or not is checked (step S645). When it is Qi=0 at the step S645, whether the smallest value F is less than (Fi−1/$\phi'i$+ 1/$\phi i$) is checked (step S646), and if so the evaluation value Fi of the class i is updated to (Fi−1/$\phi'i$+1/$\phi i$) (step S647) whereas otherwise the evaluation value Fi of the class i is updated to (F+1/φi) (step S648). Similarly, when it is Qi≠0 at the step S645, the evaluation value Fi of the class i is also updated to (F+1/φi) (step S648).

When it is qj≠0 at the step S642, these steps 643 to S648 are skipped.

Then, the queue length qj of the packet queue with VCI=j for the class i and the queue length Qi of the class i are incremented by one (step S649), and this qi is compared with the variable $W_{j_{now}}$, (step S650). When it is qj≦$w_{j_{now}}$, the VCI=j for the class i is written into the VCI memory 33 (Enqueue (i, j) of step S651), and the number nj of VCI =j for the class i held in the scheduling information management unit 16 is incremented by one (step S652), whereas when it is qj>$w_{j_{now}}$, these steps S651 and S652 are skipped.

On the other hand, the cell output processing at the step S634 is carried out according to the flow chart of FIG. 14F as follows.

First, a variable i is set to a class number of the class i which has the smallest evaluation value Fi among the currently sorted evaluation values Fi, i.e., those evaluation values Fi for which the queue length Qi is greater than 0 (step S661), and the VCI for this class i is read from the VCI memory 33 and set to a variable j (Dequeue(i) of step S662). Then, the queue length qj of the packet queue with VCI=j for the class i and the queue length Qi of the class i are decremented by one (step S663), and the decimal point processing as shown in FIG. 12C described above is carried out (step S664).

Then, whether the queue length qj of the packet queue with VCI=j for the class i is equal to 0 or not is checked (step S665). When it is qj=0 the class weight φi of the class i is decremented by wj/Wi (step S666), whereas otherwise this step S666 is skipped.

Then, whether the queue length Qi of the class i is equal to 0 or not is checked (step S667). When it is Qi is not equal to 0, the evaluation value Fi of the class i is incremented by 1/φi (step S668), whereas when Qi is equal to 0, this step S668 is skipped.

Then, the variable $w_{j\ now}$ and the queue length qj of the packet queue with VCI=j for the class i are compared with the number nj of VCI=j for the class i held in the scheduling information management unit 16 (step S669). When it is $W_{j\ now}$≧nj and qj≧nj, the VCI=j for the class i is written into the VCI memory 33 (Enqueue (i, j) of step S670), and the weight change accounting processing as shown in FIG. 12D described above is carried out (step S671), whereas otherwise the number nj of VCI=j for the class i held in the scheduling information management unit 16 is decremented by one (step S672). Then, a value of the VCI output register 38 is set to the variable j (step S673), so as to output a cell from a top of the packet queue for VCI =j.

According to this scheduling algorithm of the ninth embodiment, a value of the class by class weight set up for each class is changed when the queue length of a packet queue corresponding to a connection contained in that each class changes from zero to a positive value at a time of entering a packet into one packet queue, and when the queue length of a packet queue corresponding to a connection contained in that each class changes from a positive value to zero at a time of reading out a packet from one packet queue.

In addition, the class by class evaluation value is sequentially updated when the queue length of a packet queue corresponding to a connection contained in each class changes from zero to a positive value at a time of entering a packet into one packet queue, and when a queue length of each class changes from a positive value to zero at a time of reading out a packet from one packet queue.

Note that, in a case of managing the scheduling information separately for different virtual paths to which packets belong, a scheduling for virtual paths is carried out by using a path by path weight set up for each virtual path, and the scheduling information is managed by using a path by path evaluation value of each virtual path.

In this case, a value of the path by path weight set up for each virtual path is changed when the queue length of a packet queue corresponding to a connection contained in that each virtual path changes from zero to a positive value at a time of entering a packet into one packet queue, and when the queue length of a packet queue corresponding to a connection contained in that each virtual path changes from a positive value to zero at a time of reading out a packet from one packet queue.

In addition, the path by path evaluation value is sequentially updated when the queue length of a packet queue corresponding to a connection contained in each virtual path changes from zero to a positive value at a time of entering a packet into one packet queue, and when a queue length of each virtual path changes from a positive value to zero at a time of reading out a packet from one packet queue.

In this manner, this ninth embodiment can manage connection with large weights and connection with small weights separately as different classes, so that it is possible to reduce an absolute value of a weight of a connection with a relatively large weight, and thereby prevent the degradation of the performance of the packet scheduling apparatus compared with a case of not using a hierarchical structure.

As described, according to the present invention, it is possible to realize a sophisticated packet scheduling using both the connection weights and the queue lengths. Thus even when a group of connections with a large weight value and a group of connections with a small weight value are present and a sum of weight values of the connections is the same for both groups, it is possible to prevent the packets of the group of connections with a large weight value from being always favored in a short time scale, and therefore it is possible to provide small delay jitters.

In addition, in a case of dealing with the fixed length packets in particular, the processing time required for the scheduling can be made constant, regardless of a number of VC connections, by holding as many scheduling information as a smaller one of the queue length and the weight set up for each packet queue in the scheduling information management unit, so that it is possible to realize a probabilistically fair WFQ which is hardly dependent on the input traffic.

Moreover, by managing the scheduling information for each class of packet separately by means of class by class queues in the scheduling information management unit 16, the similar effects as described above can be obtained for both the packet scheduling among classes and the packet scheduling among connections of the same class, It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet scheduling apparatus, comprising:
   a plurality of packet queues for temporarily storing entered packets, to each of which a weight is set up;
   a packet input unit for entering the packets into at least one of said plurality of packet queues;

a scheduling information management unit for managing scheduling information for specifying an order to read out the packets stored in said plurality of packet queues, according to a queue length of each of the packet queues and the weight set up for the each of the packet queues; and a packet output unit for reading out and outputting desired packets from said plurality queues according to the scheduling information managed by the scheduling information management unit.

2. The apparatus of claim 1, wherein the scheduling information management unit manages the scheduling information by using an evaluation value of said each of the packet queues such that a packet stored in one of the packet queues for which the evaluation value is smallest among said plurality of packet queues is to be sequentially read out, the evaluation value being sequentially updated in inverse proportion to a smaller one of the queue length of said each of the packet queues and the weight set up for said each of the packet queues.

3. The apparatus of claim 1, wherein the scheduling information corresponding to said each of the packet queues is given by an identifier of said each of the packet queues.

4. The apparatus of claim 1, wherein the scheduling information corresponding to each packet queue is given by an identifier of a virtual connection when said each packet queue corresponds to one virtual connection.

5. The apparatus of claim 1, wherein the scheduling information corresponding to each packet queue is given by an identifier of a class when said each packet queue corresponds to one class.

6. The apparatus of claim 1, wherein the scheduling information corresponding to each packet queue is given by a virtual path identifier (VPI) when said each packet queue corresponds to one virtual path.

7. The apparatus of claim 1, wherein the scheduling information corresponding to each packet queue is given by a virtual path and virtual channel identifier (VPI/VCI) when said each packet queue corresponds to one virtual channel.

8. The apparatus of claim 1, wherein the weight set up for each packet queue is given by a relative ratio of bandwidth set up for a VC connection corresponding to said each packet queue.

9. The apparatus of claim 1, wherein the scheduling information management unit is formed by at least one FIFO queue.

10. The apparatus of claim 1, wherein the scheduling information management unit is formed by at least one random out queue.

11. The apparatus of claim 1, wherein packets entered by the packet input unit are fixed length packets, and the scheduling information management unit always holds as many scheduling information corresponding to one packet queue as a smaller one the queue length of said one packet queue and the weight set for said one packet queue.

12. The apparatus of claim 11, wherein when a packet is entered into one packet queue, one scheduling information corresponding to said one packet queue is entered into the scheduling information management unit if the queue length of said one packet queue is not greater than the weight set for said one packet queue.

13. The apparatus of claim 11, wherein when a packet is read out from one packet queue, one scheduling information corresponding to said one packet queue is taken out from the scheduling information management unit, and then entered into the scheduling information management again if the queue length of said one packet queue is not less than the weight set for said one packet queue.

14. The apparatus of claim 11, wherein when a packet is read out from one packet queue, one scheduling information corresponding to said one packet queue is taken out from the scheduling information management unit, and then entered into the scheduling information means again if the queue length of said one packet queue is not less than a number of the scheduling information corresponding to said one packet queue managed in the scheduling information management means and the weight set for said one packet queue is also not less than said number of the scheduling information corresponding to said one packet queue managed in the scheduling information management unit.

15. The apparatus of claim 11, wherein when the weight set for one packet queue is dynamically increased, a number of the scheduling information corresponding to said one packet queue managed in the scheduling information management unit is increased in proportion to an increase of the weight set for said one packet queue.

16. The apparatus of claim 11, wherein the weight set for each packet queue takes a real number value, and the scheduling information management unit manages the scheduling information by using a variable for each packet queue which has an average value equal to the weight set up for each packet queue and whose integer part is equal to an integer part of the weight set up for each packet queue or an integer part of the weight set up for each packet queue plus one.

17. The apparatus of claim 16, wherein when a packet is entered into one packet queue, one scheduling information corresponding to said one packet queue is entered into the scheduling information management unit if the queue length of said one packet queue is not greater than said variable for said one packet queue.

18. The apparatus of claim 16, wherein when a packet is read out from one packet queue, one scheduling information corresponding to said one packet queue is taken out from the scheduling information management unit, and then entered into the scheduling information management again if the queue length of said one packet queue is not less than a number of the scheduling information corresponding to said one packet queue managed in the scheduling information management unit and said variable for said one packet queue is also not less than said number of the scheduling information corresponding to said one packet queue managed in the scheduling information management unit.

19. The apparatus of claim 1, wherein the scheduling information management unit manages the scheduling information separately for different classes to which packets belong.

20. The apparatus of claim 19, wherein the scheduling information management unit carries out a scheduling for classes by using a class by class weight set up for each class, and changes a value of the class by class weight set up for each class when the queue length of a packet queue corresponding to a connection contained in said each class changes from zero to a positive value at a time of entering a packet into one packet queue, and when the queue length of a packet queue corresponding to a connection contained in said each class changes from a positive value to zero at a time of reading out a packet from one packet queue.

21. The apparatus of claim 19, wherein the scheduling information management unit manages the scheduling information by using a class by class evaluation value of each class, the class by class evaluation value being sequentially updated when the queue length of a packet queue corresponding to a connection contained in said each class changes from zero to a positive value at a time of entering a packet into one packet queue, and when a queue length of said each class changes from a positive value to zero at a time of reading out a packet from one packet queue.

22. The apparatus of claim 1, wherein the scheduling information management means manages the scheduling information separately for different virtual paths to which packets belong.

23. The apparatus of claim 22, wherein the scheduling information management unit carries out a scheduling for virtual paths by using a path by path weight set up for each virtual path, and changes a value of the path by path weight set up for each virtual path when the queue length of a packet queue corresponding to a connection contained in said each virtual path changes from zero to a positive value at a time of entering a packet into one packet queue, and when the queue length of a packet queue corresponding to a connection contained in said each virtual path changes from a positive value to zero at a time of reading out a packet from one packet queue.

24. The apparatus of claim 22, wherein the scheduling information management unit manages the scheduling information by using a path by path evaluation value of each virtual path, the path by path evaluation value being sequentially updated when the queue length of a packet queue corresponding to a connection contained in said each virtual path changes from zero to a positive value at a time of entering a packet into one packet queue, and when a queue length of said each virtual path changes from a positive value to zero at a time of reading out a packet from one packet queue.

25. A method of packet scheduling in a scheduler, comprising the steps of:
  entering packets into at least one of a plurality of packet queues of the scheduler for temporarily storing the packets, to each of which a weight is set up:
    reading out and outputting desired packets from said plurality of packet queues according to a scheduling information
    managing the scheduling information for specifying an order to read out the packets stored in said plurality of packet queues, according to a queue length of each of the packet queues and the weight set up for said each of the packet queues in response to entering and outputting of the packets at the entering step and the reading step.

26. The method of claim 25, wherein the managing step manages the scheduling information by using an evaluation value of said each of the packet queues such that a packet stored in one of the packet queues for which the evaluation value is smallest among said plurality of packet queues is to be sequentially read out, the evaluation value being sequentially updated in inverse proportion to a smaller one of the queue length of said each of the packet queues and the weight set up for said each of the packet queues.

27. The method of claim 25, wherein the scheduling information corresponding to each packet queue is given by an identifier of said each packet queue.

28. The method of claim 25, wherein the scheduling information corresponding to each packet queue is given by an identifier of a virtual connection when said each packet queue corresponds to one virtual connection.

29. The method of claim 25, wherein the scheduling information corresponding to each packet queue is given by an identifier of a class when said each packet queue corresponds to one class.

30. The method of claim 25, wherein the scheduling information corresponding to said each of the packet queues is given by a virtual path identifier (VPI) when said each of the packet queues corresponds to one virtual path.

31. The method of claim 25, wherein the scheduling information corresponding to each packet queue is given by a virtual path and virtual channel identifier (VPI/VCI) when said each packet queue corresponds to one virtual channel.

32. The method of claim 25, wherein the weight set up for each packet queue is given by a relative ratio of bandwidth set up for a VC connection corresponding to said each packet queue.

33. The method of claim 25, wherein the managing step manages the scheduling information by using at least one FIFO queue.

34. The method of claim 25, wherein the managing step manages the scheduling information by using at least one random out queue.

35. The method of claim 25, wherein packets entered at the entering step are fixed length packets, and the managing step always holds as many scheduling information corresponding to one packet queue as a smaller one the queue length of said one packet queue and the weight set for said one packet queue, in a scheduling information management unit of the scheduler.

36. The method of claim 35, wherein when a packet is entered into one packet queue, one scheduling information corresponding to said one packet queue is entered into the scheduling information management unit if the queue length of said one packet queue is not greater than the weight set for said one packet queue at the managing step.

37. The method of claim 35, wherein when a packet is read out from one packet queue, one scheduling information corresponding to said one packet queue is taken out from the scheduling information management unit, and then entered into the scheduling information management unit again if the queue length of said one packet queue is not less than the weight set for said one packet queue at the managing step.

38. The method of claim 35, wherein when a packet is read out from one packet queue, one scheduling information corresponding to said one packet queue is taken out from the scheduling information management unit, and then entered into the scheduling information management unit again if the queue length of said one packet queue is not less than a number of the scheduling information corresponding to said one packet queue managed in the scheduling information management unit and the weight set for said one packet queue is also not less than said number of the scheduling information corresponding to said one packet queue managed in the scheduling information management unit at the managing step.

39. The method of claim 35, wherein when the weight set for one packet queue is dynamically increased, a number of the scheduling information corresponding to said one packet queue managed in the scheduling information management unit is increased in proportion to an increase of the weight set for said one packet queue at the managing step.

40. The method of claim 35, wherein the weight set for each packet queue takes a real number value, and the managing step manages the scheduling information by using a variable for each packet queue which has an average value equal to the weight set up for each packet queue and whose integer part is equal to an integer part of the weight set up for each packet queue or an integer part of the weight set up for each packet queue plus one.

41. The method of claim 40, wherein when a packet is entered into one packet queue, one scheduling information corresponding to said one packet queue is entered into the scheduling information management unit if the queue length of said one packet queue is not greater than said variable for said one packet queue at the managing step.

42. The method of claim 40, wherein when a packet is read out from one packet queue, one scheduling information corresponding to said one packet queue is taken out from the scheduling information management unit, and then entered into the scheduling information management unit again if the queue length of said one packet queue is not less than a number of the scheduling information corresponding to said one packet queue managed in the scheduling information management unit and said variable for said one packet queue is also not less than said number of the scheduling information corresponding to said one packet queue managed in the scheduling information management unit at the managing step.

43. The method of claim 25, wherein the managing step manages the scheduling information separately for different classes to which packets belong.

44. The method of claim 43, wherein the managing step carries out a scheduling for classes by using a class by class weight set up for each class, and changes a value of the class by class weight set up for each class when the queue length of a packet queue corresponding to a connection contained in said each class changes from zero to a positive value at a time of entering a packet into one packet queue, and when the queue length of a packet queue corresponding to a connection contained in said each class changes from a positive value to zero at a time of reading out a packet from one packet queue.

45. The method of claim 43, wherein the managing step manages the scheduling information by using a class by class evaluation value of each class, the class by class evaluation value being sequentially updated when the queue length of a packet queue corresponding to a connection contained in said each class changes from zero to a positive value at a time of entering a packet into one packet queue, and when a queue length of said each class changes from a positive value to zero at a time of reading out a packet from one packet queue.

46. The method of claim 25, wherein the managing step manages the scheduling information separately for different virtual paths to which packets belong.

47. The method of claim 46, wherein the managing step carries out a scheduling for virtual paths by using a path by path weight set up for each virtual path, and changes a value of the path by path weight set up for each virtual path when the queue length of a packet queue corresponding to a connection contained in said each virtual path changes from zero to a positive value at a time of entering a packet into one packet queue, and when the queue length of a packet queue corresponding to a connection contained in said each virtual path changes from a positive value to zero at a time of reading out a packet from one packet queue.

48. The method of claim 46, wherein the managing step manages the scheduling information by using a path by path evaluation value of each virtual path, the path by path evaluation value being sequentially updated when the queue length of a packet queue corresponding to a connection contained in said each virtual path changes from zero to a positive value at a time of entering a packet into one packet queue, and when a queue length of said each virtual path changes from a positive value to zero at a time of reading out a packet from one packet queue.

* * * * *